United States Patent
Thomsen et al.

(10) Patent No.: US 8,181,222 B2
(45) Date of Patent: May 15, 2012

(54) LOCALLY ADAPTABLE CENTRAL SECURITY MANAGEMENT IN A HETEROGENEOUS NETWORK ENVIRONMENT

(75) Inventors: Daniel Jay Thomsen, Minneapolis, MN (US); Richard O'Brien, Brooklyn Park, MN (US); Jessica Bogle, White Bear Lake, MN (US); Charles Payne, Oakdale, MN (US)

(73) Assignee: McAfee, Inc., Santa Clara, CA (US)

( * ) Notice: Subject to any disclaimer, the term of this patent is extended or adjusted under 35 U.S.C. 154(b) by 1231 days.

(21) Appl. No.: 11/981,333

(22) Filed: Oct. 31, 2007

(65) Prior Publication Data

US 2008/0066151 A1    Mar. 13, 2008

Related U.S. Application Data

(62) Division of application No. 09/483,164, filed on Jan. 14, 2000, now Pat. No. 7,308,702.

(60) Provisional application No. 60/168,656, filed on Dec. 2, 1999.

(51) Int. Cl.
    G06F 17/00    (2006.01)
    H04L 29/06    (2006.01)
(52) U.S. Cl. ............... 726/1; 713/164; 380/277
(58) Field of Classification Search .................. None
    See application file for complete search history.

(56) References Cited

U.S. PATENT DOCUMENTS

| | | | | |
|---|---|---|---|---|
| 5,263,165 A | * | 11/1993 | Janis | 711/163 |
| 5,301,320 A | * | 4/1994 | McAtee et al. | 705/7.13 |
| 5,335,346 A | | 8/1994 | Fabbio | |
| 5,745,687 A | | 4/1998 | Randell | |
| 5,826,239 A | * | 10/1998 | Du et al. | 705/7.26 |
| 5,870,545 A | * | 2/1999 | Davis et al. | 709/201 |
| 5,911,143 A | * | 6/1999 | Deinhart et al. | 1/1 |
| 5,930,512 A | | 7/1999 | Boden et al. | |
| 5,937,388 A | * | 8/1999 | Davis et al. | 705/7.26 |
| 5,978,836 A | * | 11/1999 | Ouchi | 709/206 |
| 6,014,666 A | * | 1/2000 | Helland et al. | 1/1 |
| 6,035,399 A | | 3/2000 | Klemba et al. | |
| 6,038,563 A | * | 3/2000 | Bapat et al. | 1/1 |
| 6,041,306 A | * | 3/2000 | Du et al. | 705/7.26 |

(Continued)

FOREIGN PATENT DOCUMENTS

EP    0854431    7/1998

(Continued)

OTHER PUBLICATIONS

"U.S. Appl. No. 09/483,164 (Advisory Action mailed May 29, 2007)", 3 pgs.

(Continued)

*Primary Examiner* — Oscar Louie
(74) *Attorney, Agent, or Firm* — Schwegman, Lundberg & Woessner, P.A.

(57) ABSTRACT

A system and method for defining and enforcing a security policy. Security mechanism application specific information for each security mechanism is encapsulated as a key and exported to a semantic layer. Keys are combined to form key chains within the semantic layer. The key chains are in turn encapsulated as keys and passed to another semantic layer. A security policy is defined by forming key chains from keys and associating users with the key chains. The security policy is translated and exported to the security mechanisms. The security policy is then enforced via the security mechanisms.

15 Claims, 15 Drawing Sheets

U.S. PATENT DOCUMENTS

| | | | | |
|---|---|---|---|---|
| 6,078,982 | A | * | 6/2000 | Du et al. .................. 710/200 |
| 6,088,679 | A | | 7/2000 | Barkley |
| 6,182,142 | B1 | * | 1/2001 | Win et al. ................. 709/229 |
| 6,324,647 | B1 | * | 11/2001 | Bowman-Amuah ............ 726/23 |
| 6,357,010 | B1 | | 3/2002 | Viets et al. |
| 6,389,534 | B1 | * | 5/2002 | Elgamal et al. ............. 713/164 |
| 6,434,607 | B1 | * | 8/2002 | Haverstock et al. .......... 709/217 |
| 6,539,093 | B1 | * | 3/2003 | Asad et al. .................. 380/279 |
| 6,539,404 | B1 | * | 3/2003 | Ouchi ......................... 715/205 |
| 6,772,407 | B1 | * | 8/2004 | Leymann et al. ............. 717/100 |
| 6,798,413 | B1 | * | 9/2004 | Tracey et al. ................. 345/440 |
| 7,272,625 | B1 | * | 9/2007 | Hannel et al. ................ 709/200 |
| 7,308,702 | B1 | | 12/2007 | Thomsen et al. |

FOREIGN PATENT DOCUMENTS

EP            0854431 A2     7/1998

OTHER PUBLICATIONS

"U.S. Appl. No. 09/483,164 Final Office Action mailed Mar. 13, 2007", 12 pgs.

"U.S. Appl. No. 09/483,164 Final Office Action mailed Nov. 15, 2005", 17 pgs.

"U.S. Appl. No. 09/483,164 Non Final Office Action mailed Mar. 16, 2005", 15 pgs.

"U.S. Appl. No. 09/483,164 Non Final Office Action mailed Sep. 13, 2006", 13 pgs.

"U.S. Appl. No. 09/483,164 Non Final Office Action mailed Sep. 15, 2003", 14 pgs.

"U.S. Appl. No. 09/483,164 Notice of Allowance mailed Aug. 22, 2007", 8 pgs.

"U.S. Appl. No. 09/483,164 Response filed Jan. 12, 2007 to Non Final Office Action mailed Sep. 13, 2006", 15 pgs.

"U.S. Appl. No. 09/483,164 Response filed Mar. 15, 2004 to Non Final Office Action mailed Sep. 15, 2003", 17 pgs.

"U.S. Appl. No. 09/483,164 Response filed May 10, 2007 to Final Office Action mailed Mar. 13, 2007", 13 pgs.

"U.S. Appl. No. 09/483,164 Response filed May 15, 2006 to Final Office Action mailed Nov. 15, 2005", 14 pgs.

"U.S. Appl. No. 09/483,164 Response filed Sep. 16, 2005 to Non Final Office Action mailed Mar. 16, 2005", 14 pgs.

Awischus, Roland , "Role Based Access Control with the Security Administration Manager (SAM)", *Proceedings of the Second ACM Workshop on Role-based Access Control*, Fairfax, Virginia, (Nov. 6-7, 1997),61-68.

Chang, S. K., et al., "A Visual Language for Authorization Modeling", *IEEE*, (Sep. 23, 1997),110-118.

Gligor, Virgil , "Characteristics of Role-Based Access Control", *Proceedings of the first ACM Workshop on Role-based access control*, Symposium on Access Control Models and Technologies archive,(1996).

Greenwald, S. J., "A New Security Policy for Distributed Resource Management and Access Control", *Proceedings of the 1996 workshop on New security paradigms*, (1996),74-86.

Moffet, J. D., et al., "Policy Hierarchies for Distributed Systems Management", *IEEE Journal on Selected Areas in Communications*, vol. 11(9), (Dec. 1993),1404-1414.

Nyanchama, M. , et al., "The Role Graph Model and Conflict of Interest", *ACM Transactions on Information and System Security*, 2 (1), (Feb. 1999),pp. 3-33.

O'Brien, Thomsen D., et al., "Napoleon: network application policy environment", *Symposium on Access Control Models and Technologies*, Proceedings of the fourth ACM workshop on Role-based access control,(1999),145-152.

Olivier, M. , et al., "Specifying Application-level Security in Workflow Systems", *Proceedings of the Ninth International Workshop on Security of Data Intensive Applications (DEXA 98), IEEE*, (1998),346-351.

Payne, C. , et al., "Napoleon: A Recipe for Workflow", *Proceedings of the 15th Annual Computer Security Applications Conference*, (Dec. 1999),pp. 1-9.

Sandhu, R , et al., "Access Control: Principles and Practice", *Journal of IEEE Communications Magazine*, vol. 32 (9), (Sep. 1994),40-48.

Sandhu, Ravi , et al., "The ARBAC97 Model for Role-Based Administration of Roles", *ACM Transactions on Information and System Security (TISSEC)*, vol. 2 , Issue 1, (Feb. 1999),105-135.

Sandhu, R. , et al., "The RRA97 Model for Role-Based Administration of Role Hierarchies", *14th Annual Computer Security Applications Conference*, (Dec. 7-11, 1998),39-49.

Thomsen, D. , et al., "Napoleon Network Application Policy Environment", *Proceedings of the 4th ACM Workshop on Role-Based Access Control*, XP002163998, (Oct. 1999),pp. 145-152.

Thomsen, D. , et al., "Role Based Access Control Frameworks for Network Enterprises", *14th Annual Security Applications Conference*, (Dec. 1998),pp. 1-9.

Varadharajan, V. , et al., "A Multilevel Security Model for a Distributed Object-Oriented System", *Proceedings of the IEEE Sixth Annual Computer Security Applications Conference*, (1990),p. 68.

Varadharajan, V. , et al., "Issues in the Design of Secure Authorization Service for Distributed Applications", *IEEE*, Sydney, Australia,(Nov. 1998),874-879.

Yialelis, N. , et al., "Role-Based Security for Distributed Object Systems", *Proceedings of WET ICE '96*, Dept. of Computing, Imperial College,(1996), 1080-1383.

European Application Serial No. 00982361.8, Office Action mailed Jun. 14, 2011, 5 pgs.

European Application Serial No. 10012112.8, Extended European Search Report mailed Jan. 20, 2011, 7 pgs.

* cited by examiner

LOCALLY ADAPTABLE CENTRAL SECURITY MANAGEMENT IN A HETEROGENEOUS NETWORK ENVIRONMENT

PRIORITY CLAIM

This application is a divisional of U.S. patent application Ser. No. 09/483,164, filed Jan. 14, 2000, now U.S. Pat. No. 7,308,702 which claims the benefit of priority under 35 U.S.C. 119(e) to U.S. Provisional Patent Application Ser. No. 60/168,656, filed on Dec. 2, 1999, both of which are incorporated herein by reference.

STATEMENT OF GOVERNMENT RIGHTS

This invention was made with Government support under Contract F30602-97-C-0245 awarded by the Air Force. The Government has certain rights in this invention.

FIELD OF THE INVENTION

The present invention is related to computer security, and more particularly to a security management framework for controlling access to computer resources.

BACKGROUND INFORMATION

Administrating security systems is a complex task. In order to enforce a tight security policy many security constraints must be expressed. Security constraints can be classified in to two broad categories: those required by the application and those required by the local security policy. It can be very difficult for local network administrators to administer security constraints for applications. At the same time, it is also very difficult for the application developer to create security policies that apply to all sites. The problem becomes even more complex when users are dispersed across networks or applications are installed by different vendors.

What is needed is a system and method for defining and enforcing a security policy across a heterogenous set of applications, each having different security mechanisms.

SUMMARY OF THE INVENTION

The above mentioned problems with defining and enforcing a security policy across a heterogenous set of applications and other problems are addressed by the present invention and will be understood by reading and studying the following specification.

According to one aspect of the invention, in a system having one or more security mechanisms, a system and method is described for defining and enforcing a security policy. Security mechanism application specific information for each security mechanism is encapsulated as a key and exported to a semantic layer. Keys are combined to form key chains within the semantic layer. The key chains are in turn encapsulated as keys and passed to another semantic layer. A security policy is defined by forming key chains from keys and associating users with the key chains. The security policy is translated and exported to the security mechanisms. The security policy is then enforced via the security mechanisms.

According to another aspect of the present invention, a security system has a model comprising one or more semantic layers for defining different security policies and constraints for each type of user, a tool for manipulating the model and a translator for translating security policies from the model to security mechanisms in one or more computer resources.

According to yet another aspect of the present invention, a system and method are described for defining a security policy. An application policy layer and a semantic policy layer are defined. A set of access rights for a computer resource is encapsulated as a key. Keys are combined to form one or more key chains within the application policy layer. Key chains from the application policy layer are exported as keys and imported into the semantic policy layer. One or more keys in the semantic policy layer are combined to form a key chain and the key chains are exported from the semantic layer as keys. At least one key from the semantic policy layer is imported into a local policy layer and combined with other keys in the local policy layer to form one or more local policy key chains. Users are assigned to local policy key chains in the local policy layer.

According to yet another aspect of the present invention, a system and method are described for defining a security policy. An application policy layer and a plurality of semantic policy layers, including a first semantic policy layer and a second semantic layer, are defined. A set of access rights for a computer resource is encapsulated as a key. Keys are combined to form one or more key chains within the application policy layer. Key chains from the application policy layer are exported as keys and imported into the first semantic policy layer. One or more keys in the first semantic policy layer are combined to form a key chain and the key chains are exported from the first semantic layer as keys. One or more keys are imported into the second semantic policy layer and combined to form a key chain. The key chains are exported from the second semantic layer as keys. At least one key from the second semantic policy layer is imported into a local policy layer and combined with other keys in the local policy layer to form one or more local policy key chains. Users are assigned to local policy key chains in the local policy layer.

According to yet another aspect of the present invention, a system and method are described for modifying a security policy. An application policy layer and a semantic policy layer are defined. A set of access rights for a computer resource is encapsulated as a key. Keys are combined to form one or more key chains within the application policy layer. Key chains from the application policy layer are exported as keys and imported into the semantic policy layer. One or more keys in the semantic policy layer are combined to form a key chain and the key chains are exported from the semantic layer as keys. At least one key from the semantic policy layer is imported into a local policy layer and combined with other keys in the local policy layer to form one or more local policy key chains. Users are assigned to local policy key chains in the local policy layer. A role hierarchy is constructed by sorting the key chains into a partial ordering based on set containment. The partial ordering is displayed as a role hierarchy graph and keys are added and deleted from the role hierarchy graph.

According to yet another aspect of the present invention, in a system having a workflow management system and a central policy management system, a method of controlling workflow is described. A workflow class definition is created and exported to the central policy management system. Resources and roles are bound to steps within the central policy management system. A workflow instance is created in both the workflow management system and the central policy management system. The workflow instance is then executed.

BRIEF DESCRIPTION OF THE DRAWINGS

In the following drawings, where the same number reflects similar function in each of the drawings.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
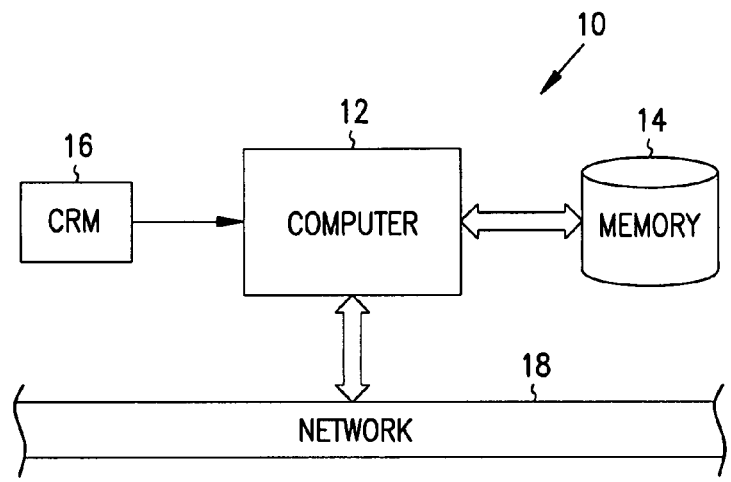
FIG. 1 illustrates a centralized security management system 10.

FIG. 1 illustrates a centralized security management system 10. System 10 includes a computer 12 connected to nonvolatile memory 14. The term "computer" is defined here to include any digital or analog data processing unit. Examples include personal computers, workstations, set top boxes, mainframes, servers, supercomputers, laptops or personal digital assistants capable of embodying the inventions described herein.

In one embodiment, computer 12 is capable of reading program code such as computer instructions and data from computer readable medium 16. Examples of articles comprising computer readable media are read-write or read-only memory devices such as floppy disks, hard drives, CD-ROM or DVD.

In one embodiment, computer 12 is capable of reading information and receiving commands and data from a network 18 and of writing data and commands to network 18.

Figure 2:
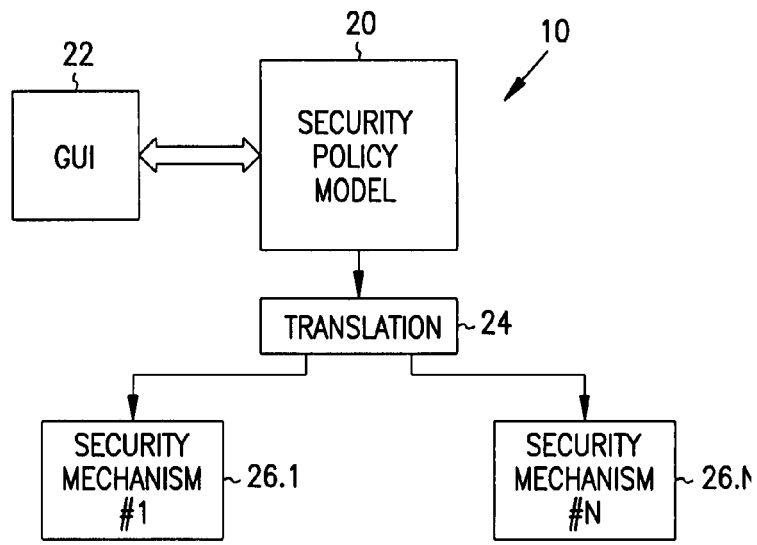
FIG. 2 illustrates a security management system having a multi-layered role-based access control model for unifying diverse access control mechanisms into a single environment.

System 10 uses an layered approach to Role-Based Access Control (RBAC). In one embodiment, as is shown in FIG. 2, security management system 10 includes a multi-layered RBAC model 20 for unifying diverse access control mechanisms into a single environment, a Graphical User Interface (GUI) 22 for manipulating model 20, and translation software 24 for translating a security policy defined by GUI 22 to specific access control mechanisms 26.1 through 26.N.

In one embodiment, system 10 provides centralized security policy management for many different access control mechanisms. System 10 is not designed to be a centralized clearinghouse for security decisions. Instead, applications are responsible for enforcement. Each application will have one or more access control mechanisms 26. System 10 is used to load the applications with the policy they are going to enforce. To be effective, a centralized security management system 10 should be able to abstract security mechanism application specific information from each security mechanism 26 and present it to the local system administrator in a clearly understandable manner.

Administrating security systems can be a complex task. In order to enforce a tight security policy many security constraints must be expressed. In one embodiment, detailed permission sets are grouped into related sets. These sets are grouped into larger sets, which may in turn be incorporated into still larger sets. Creating arbitrary sets of sets allows any policy to be expressed. However, while this offers the greatest degree of flexibility the lack of organization makes it difficult to understand and maintain the policy.

In one embodiment, therefore, RBAC model 20 is divided into well-defined layers. Each layer has a well-defined set of semantics and constraints. In one embodiment, security constraints are classified into two broad categories: those required by the application, and those required by the local security policy. A first step in designing a system to model complex security systems is to define these two broad categories and devise a consistent interface between them. One such approach is shown in FIG. 3.

Figure 3:
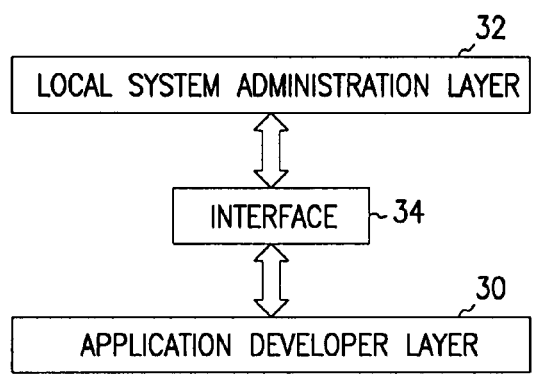
FIG. 3 illustrates one embodiment of a security management system according to FIG. 1.

In the embodiment shown in FIG. 3, RBAC model 20 includes an application developer layer 30, a local system administration layer 32, and an interface 34 for communication security constraints between layers 30 and 32. The RBAC model 20 shown in FIG. 3 applies a divide and conquer principle to the tough problem of security management. Rather than place all the burden of security management on a system administrator in the field, the application developers share the burden by creating basic security building blocks. These building blocks capture complex application specific security constraints, freeing the local system administrators from configuring the many detailed constraints. The application developers are the people who best understand the application and can best describe the application security constraints. Only the local administrators know the local security policies, thus they are the only ones who can describe their security constraints. The application designers cannot create security policies that apply to all sites. Thus the local system administrators must have the capability to create their own building blocks, should those prepared by the application developer be insufficient. The goal of the RBAC framework is to centrally control access to a wide variety of network resources. This means incorporating diverse applications on a variety of hosts, legacy applications, and applications with unsophisticated security mechanisms.

In another embodiment, interface 34 includes one or more semantic layers 36. Such an approach allows policy creation to be split between many different groups based on their assigned, or defined, semantic layers. Multiple layers allow users to work with a layer they understand. Thus a balance can be struck between fine grained access control and ease of management. The goal is to provide easy security management for a wide variety of network applications.

Before access to network resources can be granted those resources must be understood. This means that the network applications must be incorporated into the model. Applications are written in different languages and run on a variety of hosts with different security mechanisms. A universal description of applications is needed that is independent of their implementations. Currently there are two widely accepted frameworks for developing distributed network applications: CORBA and Microsoft's COM/DCOM. Both frameworks use an interface definition language (IDL) to describe how an application can be accessed. The IDL definition expresses the application in an object oriented framework by listing each object's publicly available methods. Thus, in one embodiment, an object oriented approach is used for the RBAC framework.

In one such embodiment, access is either granted to an object method or it is denied. Creating this object oriented model of the application is simple in the CORBA and COM/DCOM environments. The IDL file that describes an object's publicly available methods can be parsed and automatically incorporated into a security management tool. To incorporate a legacy application into the framework, an IDL file must be created. This involves defining the legacy application in terms of objects and object methods. This approach is similar to the method used to wrap applications with a CORBA interface for the CORBA environment. Here, however, the interface does not have to connect to the legacy application. The concern for the RBAC framework is, IF a method can be accessed not HOW. Instead, a component can be created to translate between the RBAC framework and the legacy applications enforcement mechanism.

The RBAC framework is especially useful in a heterogeneous network environment. Making access control decisions centrally for the entire enterprise would likely create a performance bottleneck. Centralized decision making also leads to a single point of failure that could shutdown the entire network. While these performance problems could be mitigated by duplicate security servers, performance would still lag local enforcement.

Figure 5:
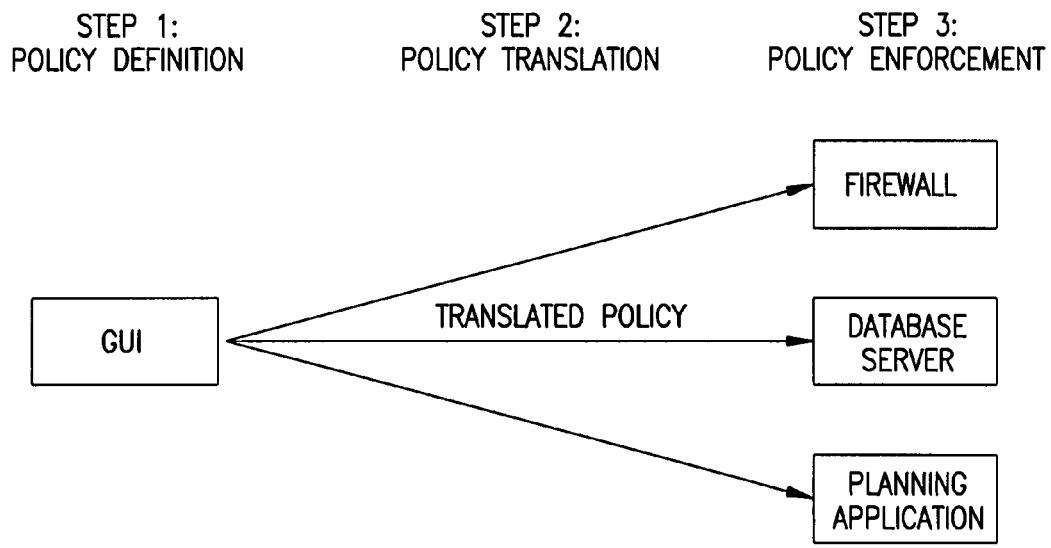
FIG. 5 illustrates a method of defining a security policy in a security management system according to FIG. 1.

In one embodiment, as is shown in FIG. 5, there are three steps in defining a security policy with system 10. First GUI 22 is used in conjunction with RBAC model 20 to define the policy. Next translator 24 translates the policy to application security mechanisms 26 within each application. Finally the application security mechanisms enforce the security policy.

It is preferable to centralize management of the policy, with the security decisions being enforced as close as possible to the application. The centralized management tool of FIG. 5 grants users access to objects. Once a change is made the tool translates the security policy from the RBAC framework to the target's native security mechanism, which is then transported to the target. For example, if a user was given access to the Internet via the security management tool, the tool translates that request into a number of modifications to a firewall Access Control List (ACL). These modifications are then communicated to the firewall, which implements the changes. The location of each application is known. The tool must push the security information out to the application making the access control decisions. Since we are assuming a heterogeneous network the central security policy must be translated into security mechanisms for each host making up the enterprise. If the target host already has an understanding of roles, or has a unified access control mechanism like CORBA, the translation process is easy. If the host does not understand roles the translation of the policy becomes more difficult. For legacy applications the translation from the RBAC framework to the legacy application's security mechanisms is harder still.

For example, protecting an FTP server on a Unix host first requires describing the FTP server in object oriented terms. For enforcement the policy must be translated to the equivalent user accounts and file permissions. While this translation is difficult, the important point is that the legacy applications can be included into the centralized policy management, albeit at a higher cost.

As noted above, system 10 can be designed to serve two primary users: application developers and local system administrators. In one such embodiment, application developers, using their in-depth knowledge of the application, create generic security components. These security components serve to hide the application-specific details. The local system administrators use these security components as the security building blocks to customize the security policy for their organization. Just as it is important to document software design to facilitate application maintenance, it is important to document the security components of the application. When the application developers create the security building blocks not only are they creating tools for the local system administrators, but they are also documenting security design and usage. Permanent documentation is critical for the long term maintenance of an application, since application developers may leave or may forget details of their implementation.

Figure 4:
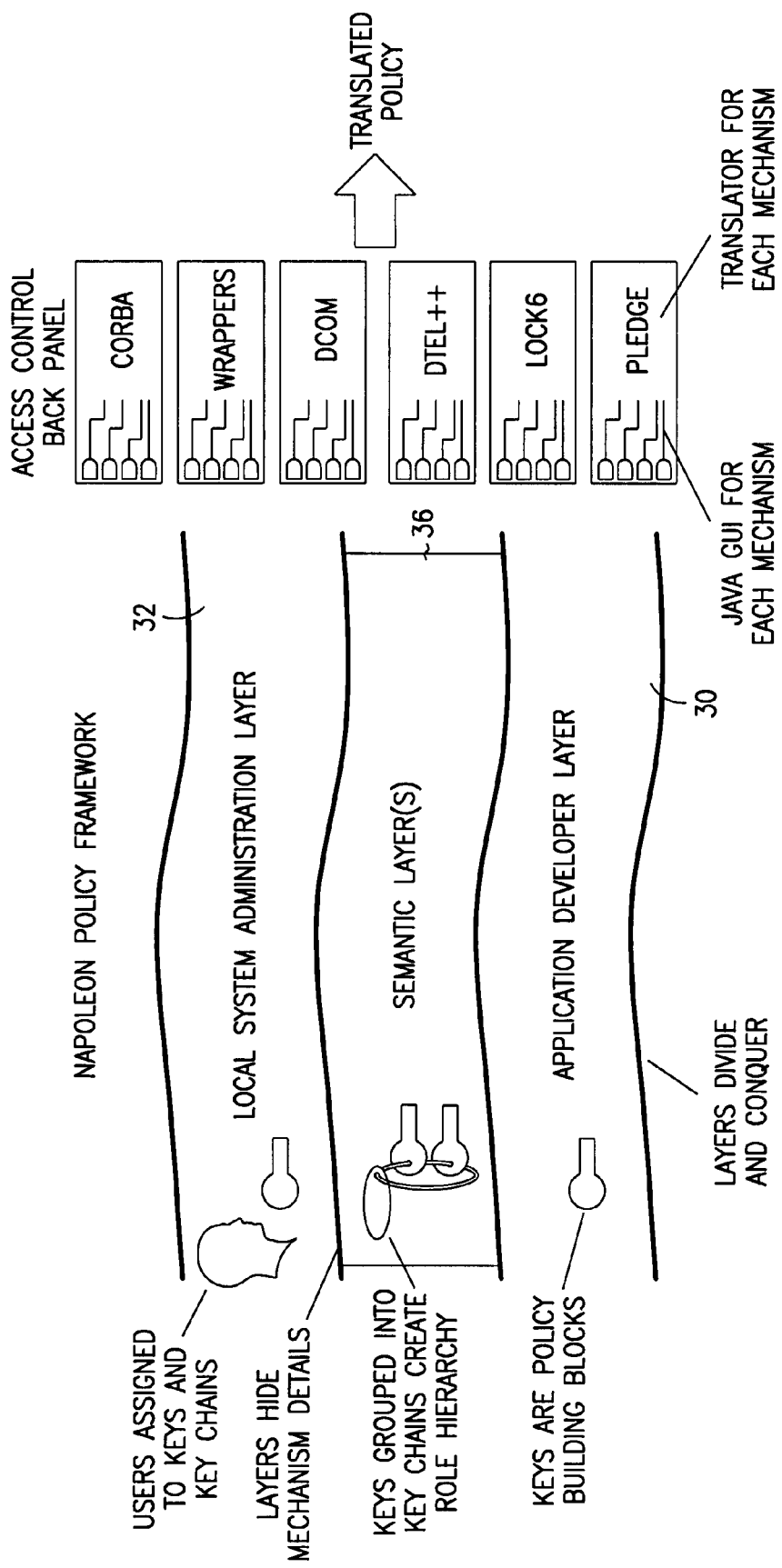
FIG. 4 illustrates another embodiment of a security management system according to FIG. 1.

Semantic layers such as the semantic layers 36 shown in FIG. 4 provide even more flexibility. For instance, applications in an application suite may have common constraints and semantics (e.g., they may all use a clipboard to move data between applications). The pattern of accesses to the clipboard is the same for each application. The architect of the application suite, therefore, is the person best suited to design the clipboard policy. In one embodiment, the architect combines the policy components created by the application developer into a new semantic layer that spans all the applications in the suite. This prevents the local system administrator from having to understand the clipboard policy.

Another example is a policy layer based on the environment in which the application runs. If a client application must communicate with a server before it can execute in a certain environment, the policy interactions between the client and server are best captured in a policy layer for the system architect rather than the local system administrator. By providing semantic layers 36, the underlying structure of each layer remains the same. Pieces of policy from supporting layers were combined to produce policy for higher layers. The number of semantic layers for a given target environment depends only on the target environment. For example, some enterprises may not have organized applications into suites; thus they don't need the application suite layer. In most discussions of security policy there is an underlying assumption that a small set of users define the policy from start to finish. The approach used in system 10 is that distinct sets of users maintain different parts of the policy based on their understanding and responsibilities.

Figure 6:
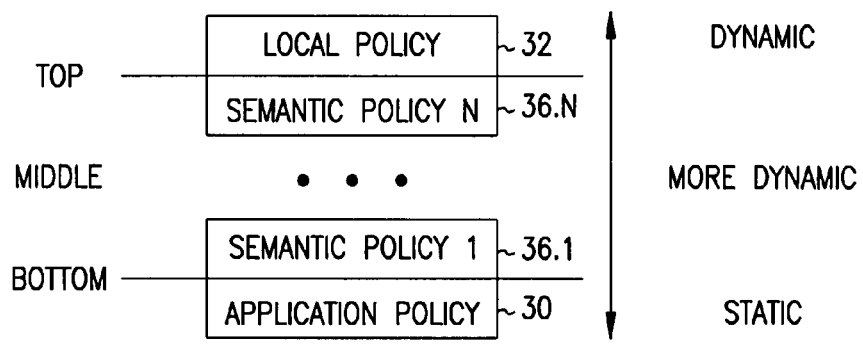
FIG. 6 illustrates another embodiment of a security management system having a multi-layered role-based access control model.

In the model of FIG. 3, there were two target users, local system administrators and application developers. The expanded model of FIG. 4 divides policy maintenance between any number of users. Each user combines policy pieces from the supporting layers to capture the policy constraints and semantics of their layer. These security building blocks are then available for other layers to build on. As is shown in FIG. 6, multiple semantic layers (36.1 through 36.N) can be used to provide as many layers of abstraction as are needed.

Figure 7:
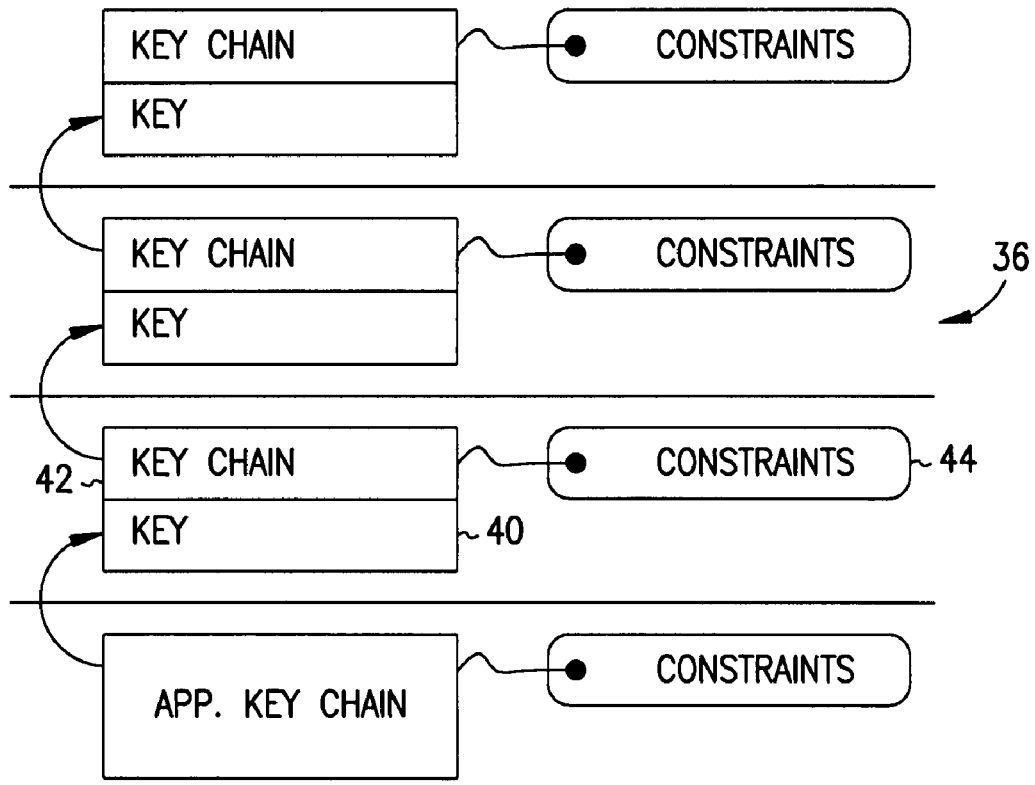
FIG. 7 illustrates linking of keys and key chains within layers of the multi-layered role-based access control model of FIG. 6.

In one embodiment, the building blocks of system 10 are called keys. A key represents the ability to access some resource, just like in the real world where having a key allows a person to open a door. Keys become an atomic unit of the security policy. A key cannot be divided into smaller access control pieces. As shown in FIG. 7, application keys 40 formed at the application developer layer are passed up to semantic layers 36 and combined and passed to the next layer. The process continues up top layer 32, which binds users to the policy pieces.

Keys are not capabilities. A key is an abstract representation of some rights, independent of the implementation mechanism. A capability is data that states the bearer has the rights defined in the capability. Capabilities can be passed to other users. System 10 manipulates keys to define the policy. Once the policy is defined it is translated into access control mechanisms.

Another common construct to all the layers is the concept of a key chain. A key chain is, not surprisingly, a collection of keys. A key chain can also contain other key chains. This allows the user to create a Partially Ordered Set (POSET) equivalent to a role hierarchy. Key chains 42 may also have constraints 44 associated with them. If the constraint is satisfied, access in the key chain is granted, otherwise it is denied.

A final common construct to all layers is the concept of abstract key chains. The concept behind abstract key chains is very similar to the object-oriented concept of an abstract class. An abstract key chain is an intermediary grouping of keys to reflect some common policy elements. For example, there may be an abstract key chain called "health care provider" that contains permissions common to doctors and nurses. A user must never be assigned to the "health care provider" key chain rather to either a doctor or a nurse.

System 10 therefore, as is shown in FIG. 6, includes a base layer 30 providing application specific access control information, middle layers 36 which are flexible semantic layers, and a top layer 32 used by the local system administrator to assign users to the policy pieces.

The first layer 30 of RBAC model 20 is the application specific access control mechanism. The goal of this bottom layer is to encapsulate application specific information so that it can be incorporated into the higher layers in a uniform manner. This data could be Unix permission bits, Access Control Lists (ACLs) on a firewall, or sets of CORBA methods. The approach is for the application developer to use their in depth knowledge of the application to create security policy pieces that can be used to assign access to users.

For example, in a health care system the application developer groups the accesses needed by a physician into a key. A doctor assigned to this key has all the necessary permission to a patient record. Internal to the application key the policy information may be organized in any way that is convenient for the application. In one embodiment, GUI 22 is able to display and manipulate the information in the key. In another embodiment, policy information is displayed in text.

Figure 8:
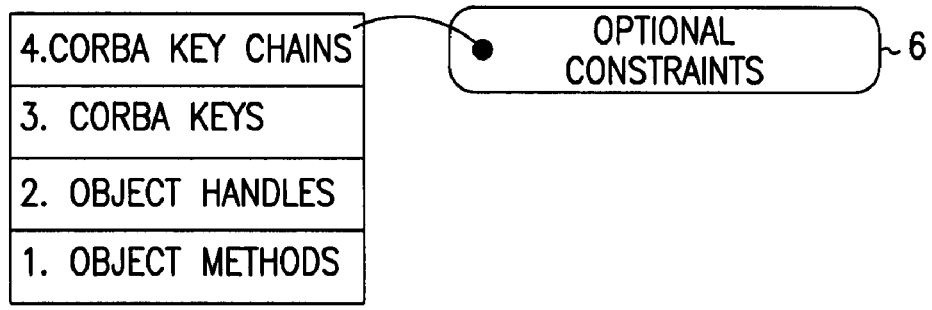
FIG. 8 illustrates a CORBA application key having four sub-layers and a constraint.

Each key has a text description of the key's intended use, and the kind of access it grants. In one embodiment, a CORBASEC version 2 provides access control to a CORBA application. In one such embodiment, as is shown in FIG. 8, a CORBA application key has four sub-layers (1-4) plus constraints 6. In the approach shown, constraints 6 are bound directly to CORBA key chains 4.

In one such embodiment, GUI 22 reads in the CORBA Interface Definition Language (IDL) file for the application. From this file the tool discovers the objects that have been defined for the application and their public methods. Object methods 1 are grouped into sets (object handles 2) based on the semantics of the object. Handles, in turn, are grouped into keys 3. In one embodiment, to control the scope of the key, keys 3 can only contain handles from within a single IDL file.

Finally key chains are groups of keys that can span several IDL files. This allows the application developer to structure their code independent of system 10 and incorporate all the necessary privileges. Each key chain corresponds to an application role and defines the methods that are allowed to that role.

For CORBA in the DTEL++ environment the interface is very similar. DTEL++ is NAI Labs implementation of Domain Type Enforcement for the CORBA object oriented environment (see, D. Sterne et al., "Scalable Access Control for Distributed Object Systems," to appear in Proceedings of the 8th USENIX Security Symposium, Washington, DC, August 1999). In addition to controlling who can access methods DTEL++ also controls who can implement the method. This is designed to protect the CORBA client from using hostile servers masquerading as legitimate servers.

In one embodiment, the key viewer for DTEL++ is identical to the CORBA viewer described above except that when a key is created it can be marked as an implement key. When the policy is translated all the users assigned an implement key get implement permission to the methods contained in the key. As noted in FIG. 8, constraints 6 can optionally be associated with key chains 4. Constraints 6 are used to capture policy information that cannot be represented as sets. Consider, for example, the fact that a role of doctor can easily describe the kinds of access a doctor needs to a patient record. However, it cannot express the fact that a doctor can only access patient records that have been assigned to them. These problems parallel the object oriented concepts of class and instance.

Once the application specific information has been encapsulated into an application key, it can be combined with other keys to form semantic layers 36 such as are shown in FIG. 7. Each layer 36 starts with a set of keys 40 and uses them to build up key chains 42 representing the policy at that level. Once key chains have been built, constraints 44 may be associated with them. The key chains for one layer become keys 40 of other layers 36. Within a layer 36 keys 40 are atomic units of policy. By drilling down to another layer 36 the user can determine how the key was composed.

Figure 9A:
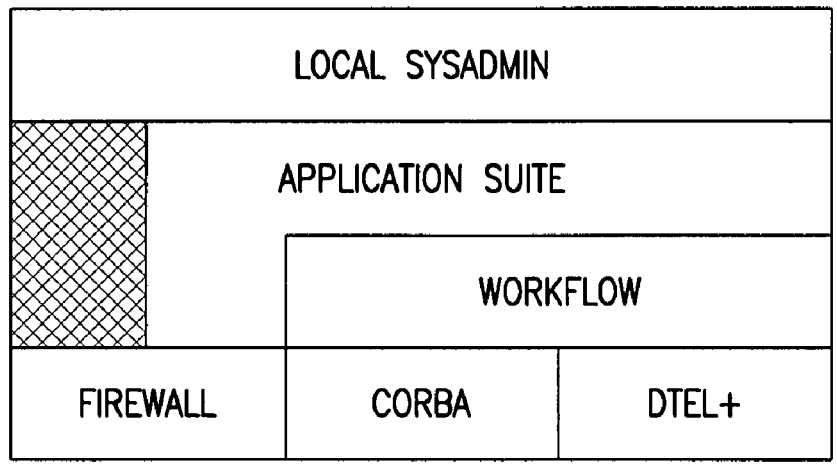
FIGS. 9a and 9b illustrate two ways at looking at the relationship between semantic layers.
Figure 9B:
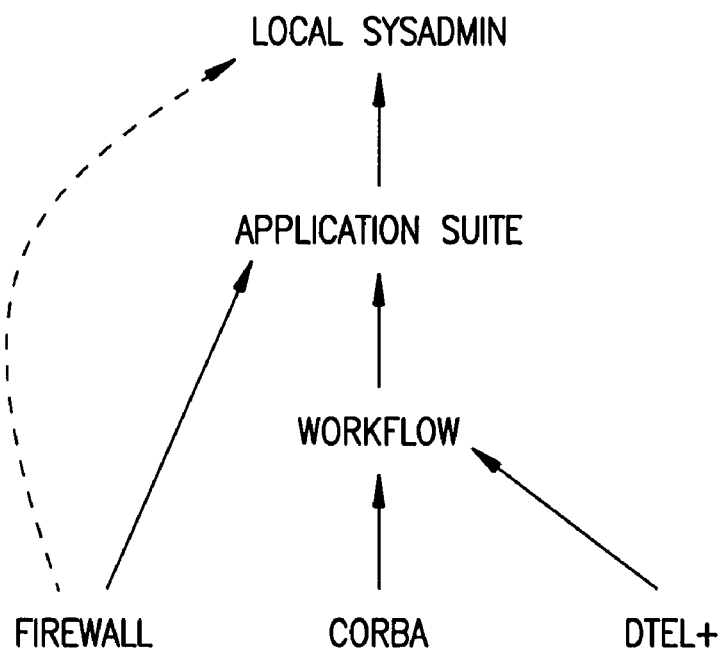

In one embodiment, semantic layers 36 are not just stacked one on top of the other; the relationship between semantic layers must be explicitly defined. For example, the workflow policy for a specific site may only cover the accounting and medical record applications. Thus the workflow layer only needs to use the policy components from accounting and medical records. In one such embodiment, model 20 requires each policy layer to explicitly import the policy components from the layers on which they depend. The result is much like the diagrams used to discuss layers in a software system (see FIG. 9*a*). However, a poset more accurately describes the relationship between semantic layers (see FIG. 9*b*), where the dotted line shows the local sysadmin may need to bypass certain layers 36 of policy to give people direct access to the firewall.

Since in one embodiment semantic layers 36 form a poset, a single layer 36 could represent any policy represented in many layers 36. The advantage of semantic layers over a standard role hierarchy is that they impose well-defined structure. Adding semantic layers to a role hierarchy does not increase the depth of the hierarchy. However, the depth of the hierarchy in each semantic layer is small, usually two or three. While hierarchies are excellent tools for programmers and researchers to use, a depth of seven starts to tax the limits of understanding. Deep hierarchies are even more problematic for system administrators without a programming background. Semantic layers allow users to focus on specific portions of the hierarchy increasing policy understanding.

In one embodiment, each semantic layer 36 has the following properties:

1. Each layer produces a set of key chains that can be exported to other layers as keys.
2. Each layer explicitly lists the other layers it is importing keys from.
3. Keys cannot be modified within a layer. Only the layer that created the key can modify it.
4. Keys can be combined within a layer to form key chains.
5. Key chains can contain other key chains (from the same layer).
6. Key chains can be marked as abstract, meaning they are structural place holders like abstract classes. In this context what this means is that these key chains are not exported to the next layer.
7. A key chain may have constraints associated with it. If constraints are associated with a key chain the constraints must be satisfied before access is granted.

Semantic layers 36 clearly divide responsibility for policy creation between several different users. However, it is a static type of administration. The import and export of policy components make semantic layers more static. The static nature of semantic layers has little impact because they are closely tied to static application descriptions. In fact, the application keys are a part of the application interface that deals with policy. The application keys change as frequently as the application interface.

As is shown in FIG. 6, starting from the bottom of RBAC model 20, there is a general trend for the lower layers to be more static because they are tied closely with the application, and the upper layers to be more dynamic. System administration can be simplified by limiting decisions to ranges of roles to be managed in the role hierarchy. A semantic layer is equivalent to a range of roles. Many of the challenging problems in maintaining policy consistency are avoided in such an approach because the new policy is installed at the same time the latest version of the application is.

Changes to the underlying applications will, however, on occasion require changes at the top level of model 20. For example, if the sysadmin depends on a "browse" key and the latest version of the application does not have it, the sysadmins must recreate their policy to compensate for the loss of the key. In one embodiment, migration tools are provided to guide the sysadmin into choosing a new key to replace the deleted key.

Figure 10:
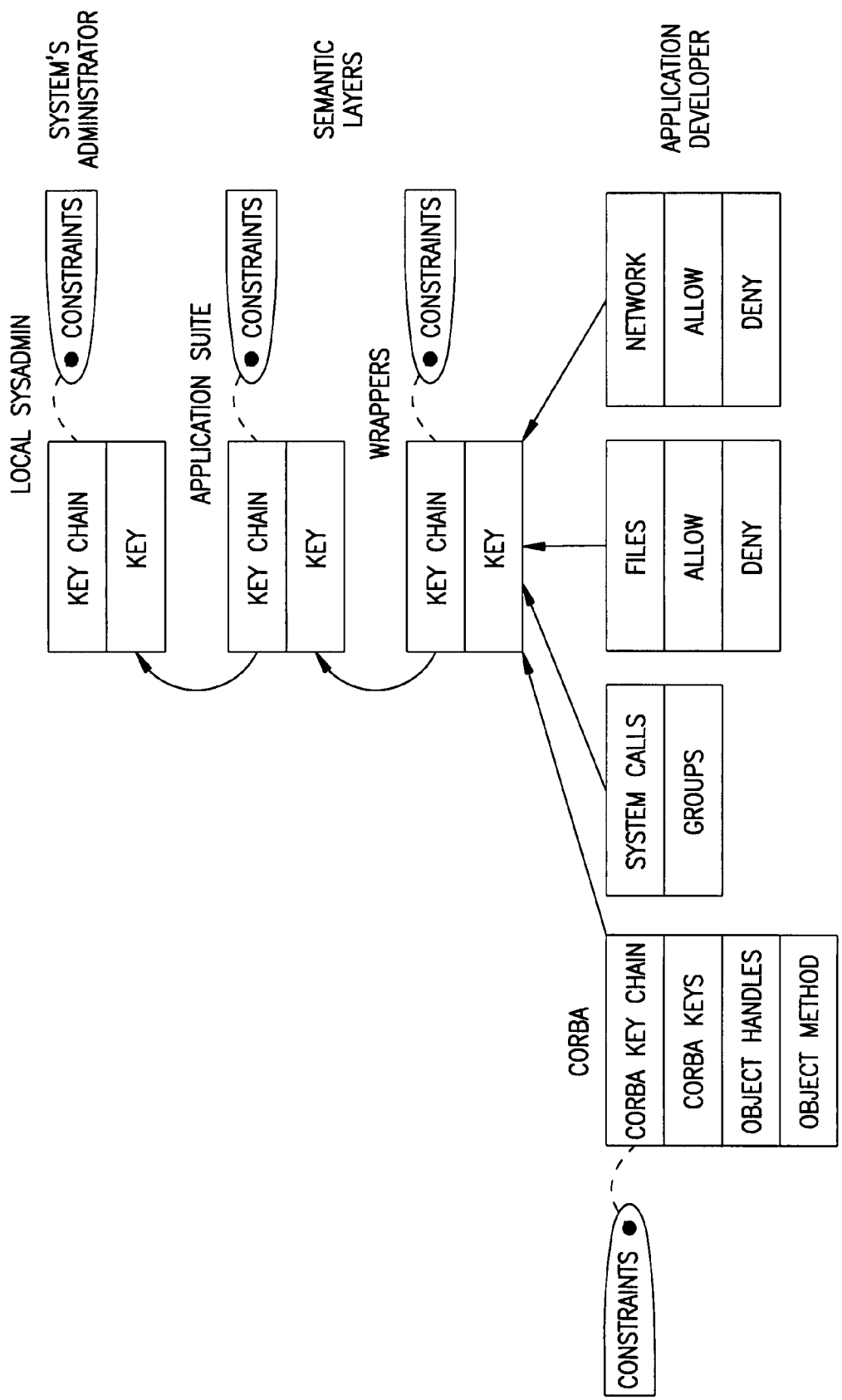
FIG. 10 illustrates a CORBA-based model 20 having two semantic layers used to transfer security mechanisms to the system administration layer.
Figure 11:
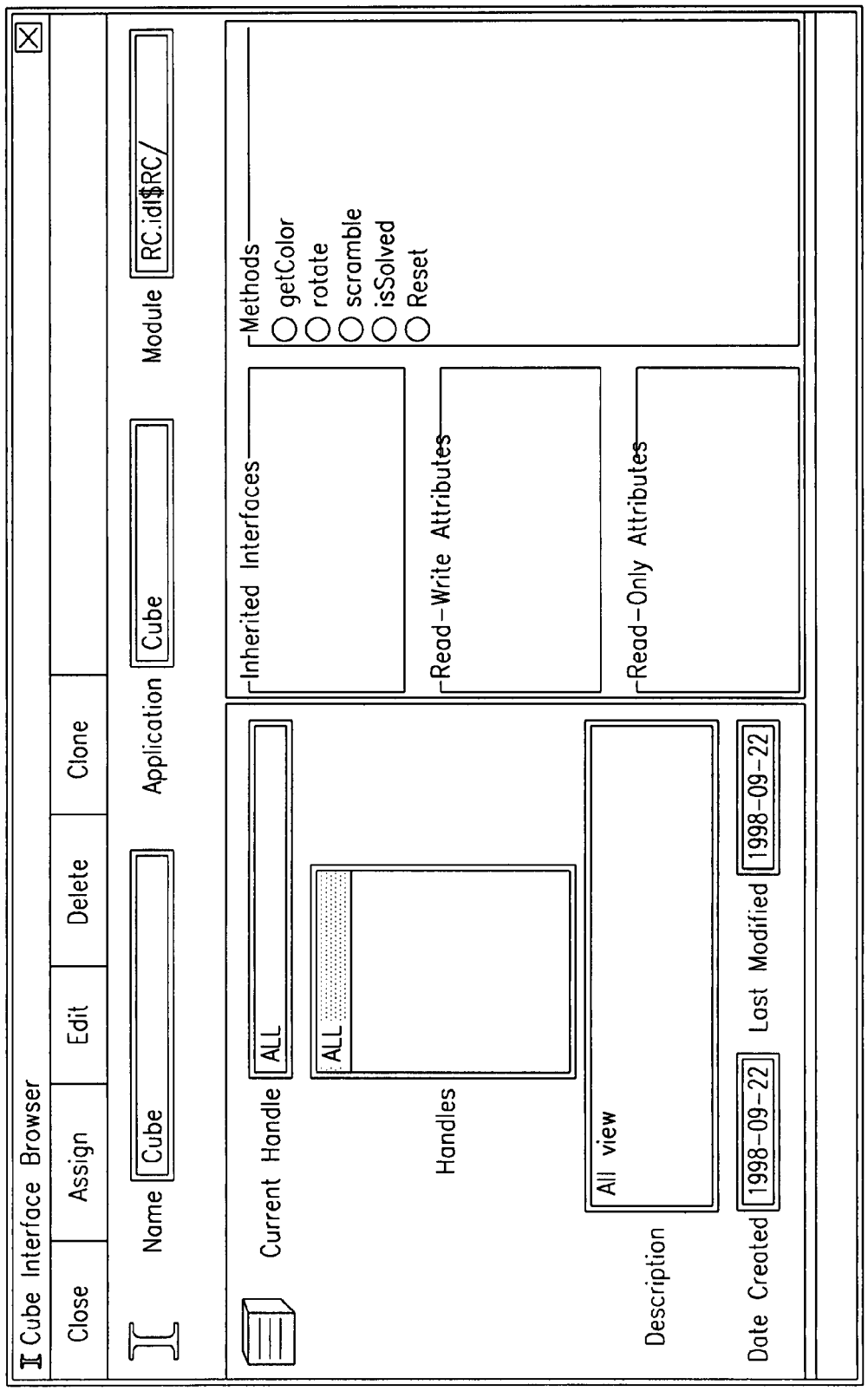
FIG. 11 illustrates a GUI screen which could be used to define handles.

The final layer of RBAC model 20 is identical to the other layers except that at this level users can be associated with key chains 42. The top layer is the only layer where such user role binding takes place. The top layer is also assumed to be under the control of the local sysadmin. As noted above, the top layer is more dynamic than the lower layers as it must respond to the day-to-day operations of network 18. One embodiment of a CORBA-based model 20 is shown in FIG. 10, where two semantic layers (Application Suite and Wrappers) are used to transfer security mechanisms to the system administration layer. A GUI 22 screen which could be used to define handles is shown in FIG. 11.

In one embodiment, it is assumed that the local sysadmins are not familiar with the applications and that they must, therefore, depend on the application developer to create policy pieces they can use to set up local policies. Invariably some pieces will not be sufficient. When this is the case, in one embodiment, GUI 22 allows the sysadmin to "drill down" to other layers 36 and create a new key chain that meets their requirements. In one such embodiment, sysadmins are limited to drilling down only one semantic layer 36.

The next section looks at the issues that arise from trying to clearly display system 10 concepts to different users with different responsibilities and varying levels of sophistication. When considering how to display policy information to a user, an important distinction must be made between policies that are designed and policies that evolve over time.

A basic premise of RBAC model 22 is that semantic levels 36 are designed. The application developers and system architects must put as much time developing the security policy pieces as they would in generating a good API. Application developers and system architects are familiar with object-oriented hierarchies. Thus building and maintaining a good role hierarchy is a task they are well suited to do.

On the other hand the skills of the local sysadmin can vary greatly. They may have little or no experience with inheritance concepts used by the role hierarchy. More importantly sysadmins usually have a large number of responsibilities that keep them extremely busy. As a result they do not have a great deal of time to devote to learning a new tool, and in particular they do not have time to design a role hierarchy. In fact, a role hierarchy for a local enclave can quickly change due to the introduction of new applications or policy directives. As a result, a policy created by a sysadmin evolves over time to meet the needs of the organization.

Figure 12:
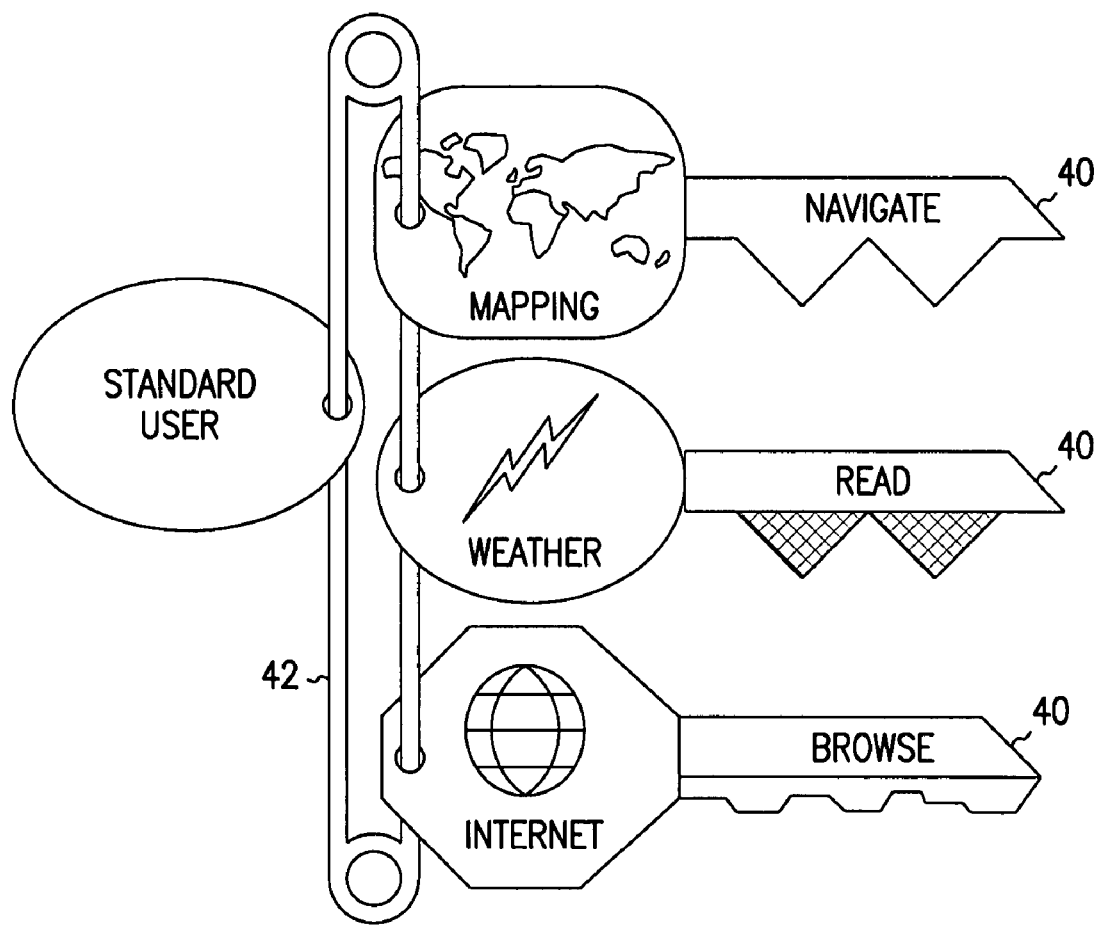
FIG. 12 illustrates a key chain having three keys.

In one embodiment, GUI 22 is designed to accommodate both a design and an evolutionary approach to policy development. The local sysadmin needs a simplified way to create and maintain the local policy. A role hierarchy may be needed to express the potential policies, but a poset is a confusing data structure for the sysadmin to maintain. The most effective role hierarchies must be carefully designed, which the sysadmin does not have time to do. To simplify the GUI, in one embodiment key chains 42 are prevented from containing other key chains 42 within local system administration layer 32. This results in each key chain simply having a list of keys. One such representative key chain 42 is shown in FIG. 12, where three keys 40 are combined to form a standard user key chain 42.

Limiting key chains at local system administration layer 32 to combinations of keys 40 may seem like a drastic measure but, if the lower semantic layers have done their job, all the policy pieces should be there for the local sysadmin. As a result the role hierarchy for the top layer is very shallow. Practical experience in other environments shows that the role hierarchy is not very deep, rarely more than three. For such shallow structures the benefit of the role hierarchy is small compared to the gain in simplification.

Simplicity does, however, come with a cost. Lack of a role hierarchy makes three operations more difficult: 1) visualizing the relationship between roles; 2) creating a new role; and 3) global policy changes that affect more than one role. Each of these drawbacks are discussed in more detail below.

The drawbacks of eliminating role inheritance can be mitigated by a hybrid approach that constructs a role hierarchy from the lists of keys. In such an embodiment, each key chain 42 is a set of keys 40; GUI 22 sorts the key chains into a partial ordering based on set containment. For example, a key chain with keys {a, b, c} is more powerful than a key chain with {b, c}. Key chains with the most keys appear on top, key chains with fewer keys on the bottom. Once the partial ordering is calculated the information is shown to the sysadmin via a standard role hierarchy graph. The benefit of this approach is that the sysadmin does not have to maintain the role to role relationships explicitly, the tool constructs the role hierarchy for the user.

The first problem is visualization. A role hierarchy is an excellent way to get a quick snapshot of the relative privileges between roles. For a shallow role hierarchy visualization is probably not an issue. Furthermore, the constructed role hierarchy easily can be displayed as a standard role hierarchy with all the proper visual semantics.

The second problem is in creating a new role. In a role hierarchy, the new role is created by first determining its parent. The role derives most of its content from the parent. Without a role hierarchy there is no parent so all of the keys for the new role have to be specifically added. To make role creation simpler without a role hierarchy, in one embodiment, the user is allowed to select keys or key chains to add to new key chains. Since the underlying structure is based on sets, duplicate keys are eliminated during the process. In one such embodiment, creating a new role starts with creating an empty key chain. The user can then select a set of keys from other key chains or a set of key chains to copy into the new key chain.

Figure 13A:
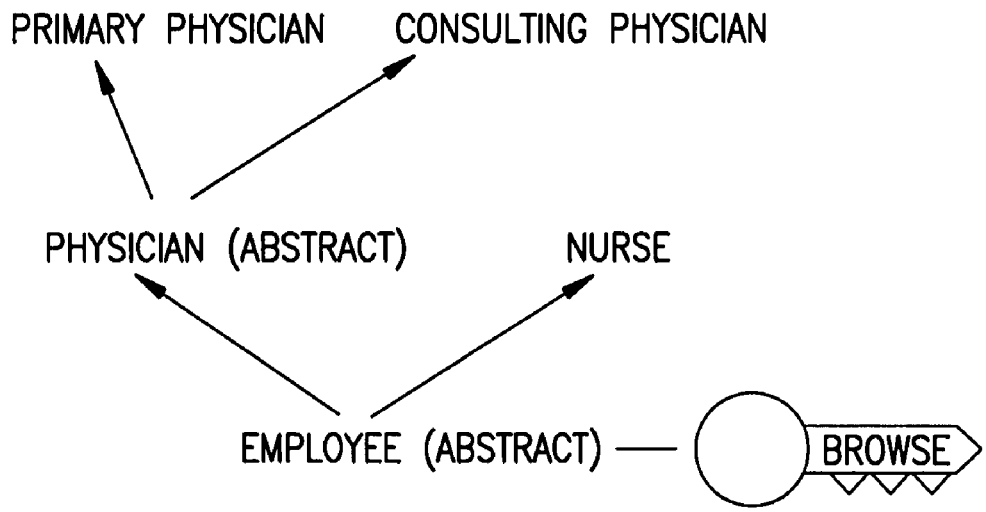
FIGS. 13a and 13b illustrates inheritance.

The third difficulty arises from the fact that low level constraints 44 could be modified in a single place and that these changes would directly impact all the senior roles. Consider the policy in FIGS. 11a and b. In FIG. 13a, system 10 includes role inheritance. In such an approach, the local policy has changed; now, all employees were allowed to browse the web. With a role hierarchy the "browse" key could be added to the employee node and the permission would automatically flow up the hierarchy.

Figure 13B:
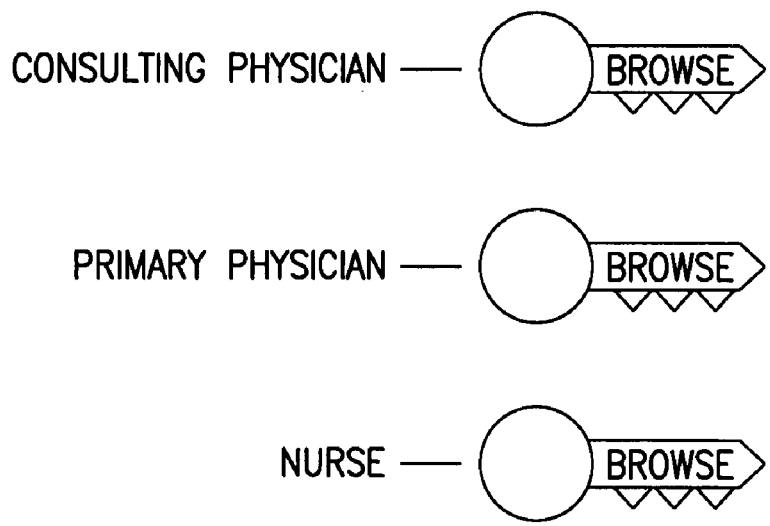

On the other hand, as can be seen in FIG. 13b, without role inheritance there would only be three roles: primary physician, consulting physician and nurse (because the abstract roles do not exist). Without role inheritance the "browse" key must be added directly to the three roles. Initially, adding two extra keys does not seem like a great burden compared to eliminating the complexity of maintaining a poset.

In one embodiment, the user makes global policy changes by adding or deleting keys from the constructed role hierarchy. System 10 then translates the operation from the constructed hierarchy to the underlying roles. Creating a new role could also be done using the constructed hierarchy to indicate the parent and the role's context. The constructed hierarchy obtains the advantages of the role hierarchy without the complexity of designing and maintaining it.

Eliminating the role hierarchy only makes sense, however, when the security policy is evolving. Clearly a designed policy is more desirable, but design takes effort and so it is best suited for a static environment. A well-designed role hierarchy represents constraints, such as "all employees can access the online vending machine". When GUI 22 calculates the partial ordering, however, there are no semantics associated with the relationship between roles. Eliminating role inheritance simplifies maintenance only if the operations of creation of new roles, and adding global constraints are rare. If they happened frequently a role hierarchy is the best approach.

Scale is another factor. Role hierarchies scale better than flat lists as the number of roles goes up. So if assumptions about the number of sysadmin roles are wrong, a role hierarchy may be a better approach. In fact, a hybrid approach is possible. A sophisticated sysadmin may create a new semantic layer 36 just below top layer 32. The new layer would have a role hierarchy for capturing the more static sysadmin's constraints. The top layer retains the simplified interface for the rapidly changing portions of the policy.

While each semantic layer has to meet the conditions outlined above, how each semantic layer 36 is presented to the user can very greatly. The distinguishing characteristic of each layer is semantics, which implies each layer 36 could be presented differently based on those semantics. For example, in a workflow layer the order of the steps is important to the user but not to the model. The viewer must include the step order information to provide the user with the context they need. Thus, in one embodiment, GUI 22 supports a separate viewer for each layer.

Sometimes, however, it is simply the grouping of keys that provides semantics, such as in the case of an application suite layer. In these cases a generic viewer is needed that provides an interface for manipulating keys and key chains. Often the cost of creating a specific viewer for a layer is prohibitive. In these cases the generic viewer can also be used.

Application development layer keys pose an interesting problem. Each security mechanism, for the most part, has already developed a way for viewing its policy. Rather than duplicate the GUI of the original mechanism, in one embodiment it is possible to use the security mechanism's native GUI remotely from GUI 22. For example, a firewall GUI can be used to manipulate user ACLs on a proxy.

At other times the native viewing mechanism is too complex or does not lend itself well to being encapsulated. In such cases an opaque key can be created. An opaque key is a construct for representing policy pieces that cannot be manipulated by the user in system 10. The administrator cannot "drill down" into the key, only the key's description of its intended use is provided. The opaque key represents some access privilege. No access control information resides, however, in the opaque key. The access control details are filled in when the policy is translated to the target mechanism. The opaque key approach lets the user assign predefined privileges for complex access control mechanisms.

Once a security policy has been specified in system 10 it must be translated to the application specific security mechanisms. In one embodiment, the translation process works much like a compiler. A great deal depends on the security mechanism supported.

In one CORBA embodiment, the entire policy is translated to each target mechanism. In another embodiment, parts of the policy are translated to different security mechanisms. For example, Pledge enforces part of the policy and DTEL++ enforces the rest.

A translator can also be designed for Microsoft's COM/DCOM distributed object protocol. To enforce access control on methods in DCOM, DCOM interceptors were designed to access requests, providing fine-grained access control.

The work with policy translation has provided two important lessons. First, sets provide an excellent starting point for combining and working with policy. Building a translator once the security mechanism is in place is usually a simple matter of conversion taking less that two weeks.

Second, a relational database is useful for converting set-based policies. The database allows one to construct queries to pull out the relevant pieces. For example, the DTEL++ translation relies heavily on a relational database to calculate the minimum number of equivalence classes for DTEL++ types.

Workflow

System 10 also provides a practical solution for business process control, or workflow, policy management. System 10 addresses two challenges posed to workflow technology developers: simplify policy management and support distributed computing systems. The layered model of system 10 simplifies policy management by dividing the burden among all principals in the system's development. System 10 supports distributed computing systems by providing policy translators for the various enforcement mechanisms in the distributed system. Modeling workflow in system 10 is simple, because the underlying concepts of workflow are consistent with the RBAC model. However, implementing workflow is more complicated. RBAC policies are primarily class-based, but workflow policies are very much instance-based.

As discussed above, each model 20 policy layer can be fashioned by a different person. In one embodiment, system 10 uses a role-based access control (RBAC) modeling environment. The environment consists of a policy model and a software tool for defining and managing the model. In one such embodiment, the software tool is implemented in Java with a model-view-controller architecture.

As discussed above, model 20 is multilayered (see, e.g., FIGS. 3, 4 and 6). In one embodiment, each layer defines a set of roles that become policy building blocks for all layers dependent on that layer. The bottom policy layer defines the most primitive access control policy. This policy layer is typically application specific and is defined in terms of the access control mechanisms that manage the application's resources. The second through penultimate layers use the roles defined at other layers to create even more abstract roles that simplify policy management. There can be an arbitrary number of layers; new layers can be introduced as required. Roles defined in the top layer are assigned to users.

Each policy layer can be fashioned by a different designer. Application designers define the bottom layer because they understand best what their resources are and how access to these resources should be constrained. Several designers may contribute to a single layer (e.g., there may be several applications represented in the bottom layer).

System administrators define the top layer since they know who their users are. Intermediate layers may be designed by a number of people. As noted above, an application suite designer may group the roles of participating applications into roles for the suite. A system integrator may create more abstract roles based on the suite roles.

It is important to note that layers in model 20 may not be strictly one above the other. A particular layer may, for instance, build on roles defined in any layer below it, not just the layer immediately below it.

For example, the local system administrator is not restricted to roles defined in the penultimate layer. Roles assigned to users can be culled from any layer as needed.

As noted above, model 20 uses the metaphor of a key to simplify policy management. A key corresponds to a role. Within each layer, keys are collected into key chains for easier handling. Keys cannot be exported directly to higher layers, but they can be incorporated into a key chain with only one key. In one embodiment, key chains can also contain other key chains. Such an approach supports role hierarchies.

Figure 14:
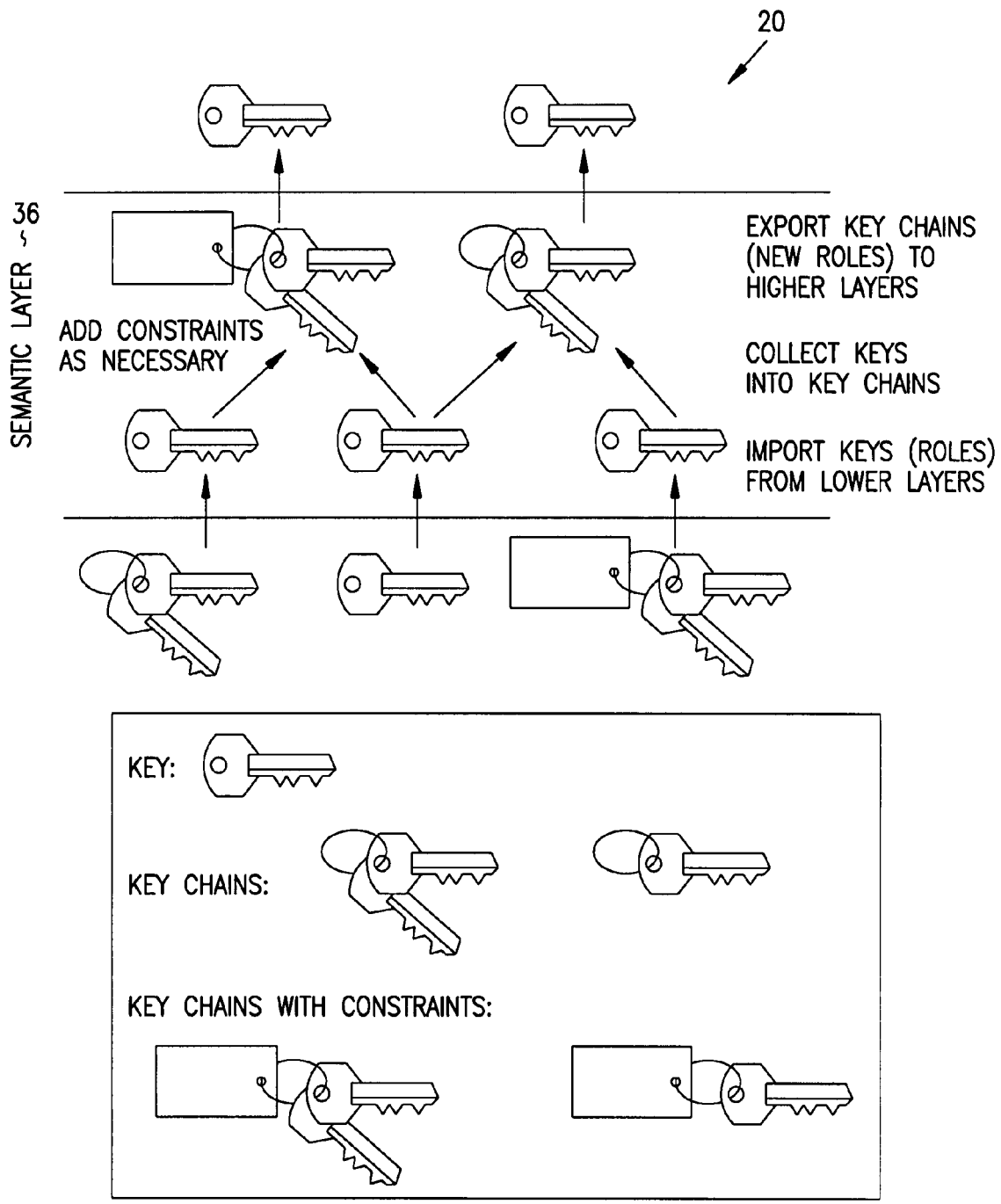
FIG. 14 illustrates how keys and key chains are used to build semantic layers.

In one embodiment, model 20 is capable of associating a constraint with each key chain. The constraints place additional restrictions on the use of the key chain. For example, a key chain may allow access to patient medical records, but constraints may prevent the holder of the key chain from accessing any records for which the holder is not the primary care physician. FIG. 14 illustrates how keys and key chains are used to build semantic layers 36 in RBAC model 20.

By building semantic layers with keys and key chains, system 10 enables the use of a graphic user interface such as GUI 22. In one embodiment, GUI 22 includes a viewer for each layer of the model. As noted above, while the middle layers of the model are identical structurally, they may differ semantically depending on the designer, so a different viewer is supported in each case. The tool manages the export and import of keys between layers and directs the policy translators to convert the policy rules of model 20 into the enforcement languages of the underlying policy enforcement mechanisms. In one embodiment, GUI 22 is very modular; new viewers and policy translators can be added easily.

Figure 15:
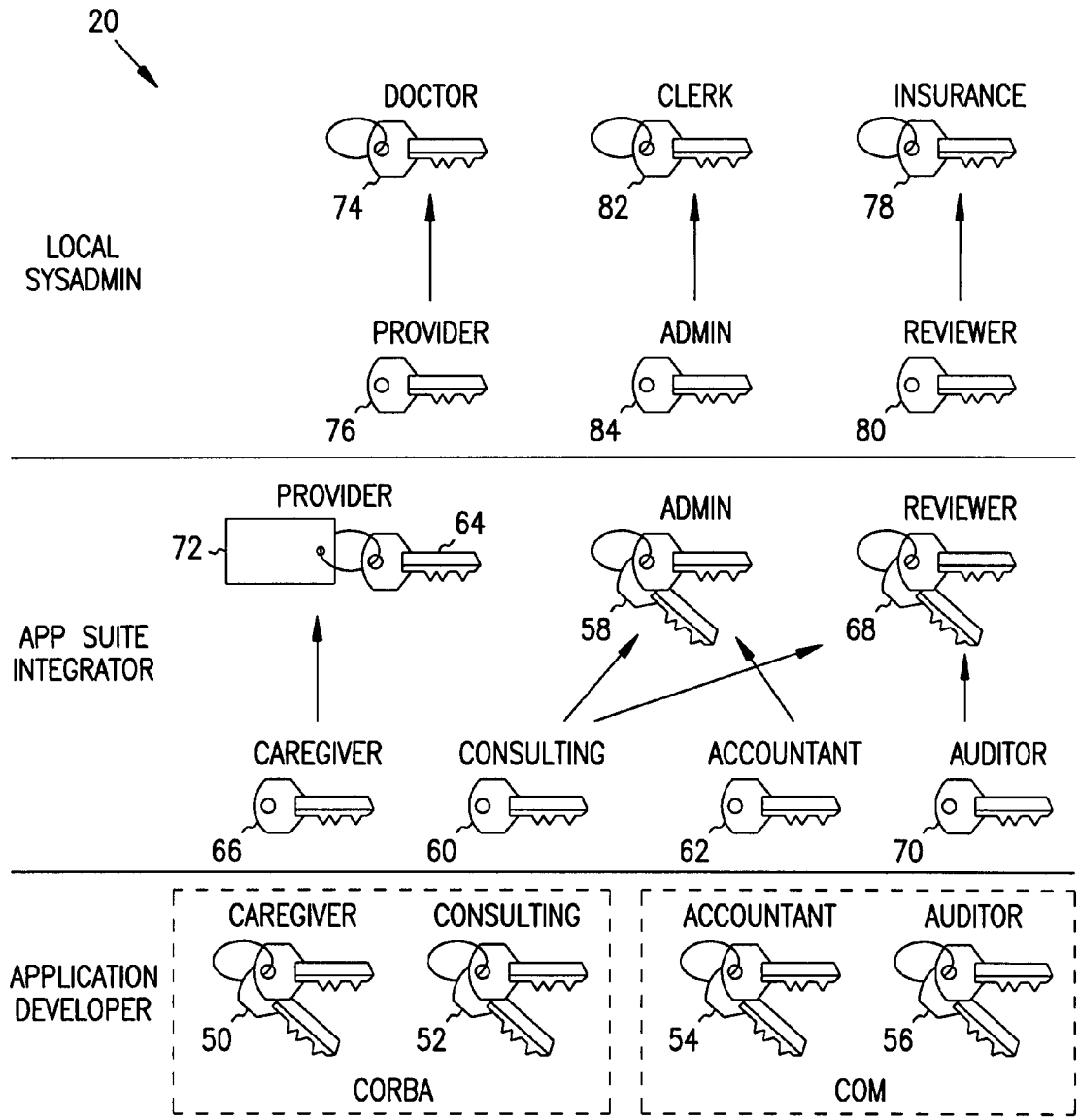
FIG. 15 illustrates an RBAC policy modeled as three layers.

Consider a simple example of a hospital data system that is composed of two applications: a CORBA application used by the medical staff to record and share patient information and a COM billing application. The hospital purchased these applications from a third party integrator. The system's RBAC policy is modeled in system 10 as three layers, which are illustrated in FIG. 15.

In the bottom layer, the designers of the CORBA application and the COM application define their application policies independently. For CORBA and COM-based applications, system 10 gathers a list of supported operations, or methods, automatically from the application's interface definition language (IDL) files. In one embodiment, each application designer uses GUI 22 to group these methods into convenient sets called handles and then to assign handles to keys. A key designates that the holder has permission to execute the associated methods. Since CORBA and COM are object based, controlling access to an object's methods is sufficient for controlling access to the object itself.

To define the application security policy, the application designer uses GUI 22 to collect keys into key chains and marks the key chains for export to higher model layers. By marking key chains for export, the application developer creates policy building blocks for other layers to build upon. It is similar to creating a software interface. In one embodiment, anything not explicitly included in the interface is not available for use outside the layer.

For our simple example, the CORBA-based, patient information application designer exports two key chains: a CAREGIVER key chain 50 for creating and modifying patient records and a CONSULTING key chain 52 for only viewing patient records. The COM-based billing application designer also exports two key chains: an ACCOUNTANT key chain 54 for generating billing data and an AUDITOR key chain 56 for only viewing billing data. These four key chains represent application-specific roles that are available as building blocks for higher layer policies. In the middle layer, an application suite integrator imports the four key chains from the application layer. Once a key chain is exported, it is considered an atomic entity, so it is considered a key by all higher layers. The application suite integrator is charged with defining a policy that spans all applications in the suite. In this example, the application suite builds three key chains for export: the ADMIN key chain 58 that contains the CONSULTING key 60 and the ACCOUNTANT key 62, a PROVIDER key chain 64 that contains the CAREGIVER key 66, and a REVIEWER key chain 68 that contains the CONSULTING key 60 and the AUDITOR key 70.

PROVIDER key chain 64 includes a constraint 72 that the holder must be a primary care provider for the patient whose records are being accessed. At the top layer, the three key chains 58, 64 and 68 exported from the middle layer (ADMIN, PROVIDER and REVIEWER) are available as simple keys. In one embodiment, the four key chains 50, 52, 54 and 56 exported from the bottom layer (CAREGIVER, CONSULTING, ACCOUNTANT and AUDITOR) are also available in the event that ADMIN, PROVIDER and REVIEWER are not sufficient, but they are not immediately visible.

While the hospital is tied to a regional information network, it employs a small staff that must wear many hats. The system administrator uses system 10 to create three key chains to assign to users: the DOCTOR key chain 74 contains only the PROVIDER key 76, the INSURANCE key chain 78 contains only the REVIEWER key 80, and the CLERK key chain 82 contains only the ADMIN key 84.

In one embodiment, constraints applied to any keys contained in a key chain apply to the key chain also. For example, a user in the DOCTOR role can only modify patient records for which the user is the primary care physician. Once the hospital's security policy is defined, the system administrator directs Napoleon to translate the policy for the CORBA and COM object managers. These object managers enforce the policy for their respective objects. In other words, as users attempt to access patient records or billing data, the object managers ensure that the users have the appropriate role and that stated constraints are satisfied.

A workflow is "the computerized facilitation or automation of a business process, in whole or part." Workflow technology is a promising solution for protecting business assets, because it controls not only who has access to what but when that access occurs. Workflow can be represented as a directed graph with one entry. Each node in the graph is a workflow activity, or step; the edges determine the order in which steps must occur. One or more objects to be accessed are associated with each step (e.g., "check request"), as are the operation or operations to be performed (e.g., "approve check request" and the performer ("MANAGER").

Riddle [W. Riddle, "Fundamental process modeling concepts", *Workshop on Workflow and Process Automation in Information Systems*, National Science Foundation, May 1996] identifies the fundamental concepts of workflow and describes the relationships between them. According to Riddle, a "step" is a unit of work. It may require several resources to complete. Associated with the step are those resources and the role required to perform it.

A "work product" is an artifact created or modified by steps. Steps use and produce work products. A "role" represents the accesses that are required to perform a step. A "workflow condition" is a predicate that must be satisfied during step performance. It is often expressed as entry and exit conditions on the step, that is, the step can begin when and can end when the conditions are true. A "performer" is a person or tool with the skills necessary to complete the step. A role may require special skills and therefore a specific performer. Finally, a "method" is an approach for carrying out a step. A step can be performed using one of several methods. The performer can do these methods.

Figure 16:
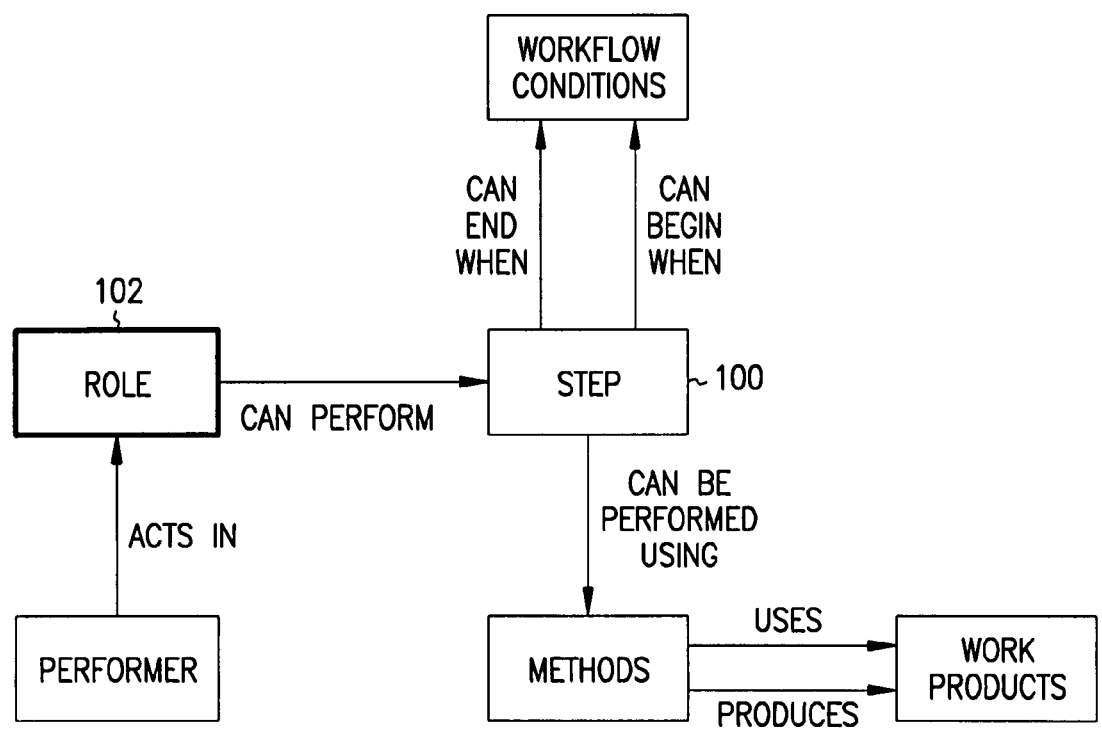
FIG. 16 illustrates a role-based perspective of workflow.

Several of these concepts, such as roles, methods and performers, are also fundamental concepts for RBAC. Even the concept of work products is familiar; it is just a different name for the resources to be accessed. Only steps and workflow conditions are really new. FIG. 16 illustrates Riddle's concepts using a role-based perspective, rather than a more traditional step-based view.

From this perspective, steps 100 are like sub-roles. That is, steps define a group of accesses that are specific to a task. Workflow conditions determine when the sub-roles are active. A role 102, then, is a collection of steps 100 and their associated workflow conditions.

Workflows are enforced by a workflow management system (WMS). The user interacts with the WMS to gain access to resources controlled by the workflow. Automated workflow technology has evolved significantly since it was introduced thirty years ago for office automation systems. Early workflow systems did not acknowledge the variety of ways that humans perform a task. So researchers focused on better modeling techniques, and today workflow research is more interdisciplinary: a combination of computer science and social science. The WMS must encompass non-computer activities such as meetings, handle unexpected contingencies, and allow new workflows to be constructed from existing workflows. Workflow process models must be reconciled with the rich variety of activities and behaviors that comprise "real work". In short, workflow management is a complex activity, and we want to leverage existing technology as much as possible.

Workflow management can be simplified considerably by adopting an RBAC model. Many role-based models, however, fail to include the role authorization constraints that are required for workflow. Since system 10 is capable of defining and applying role constraints, it is a good candidate for workflow policy management.

Figure 17:
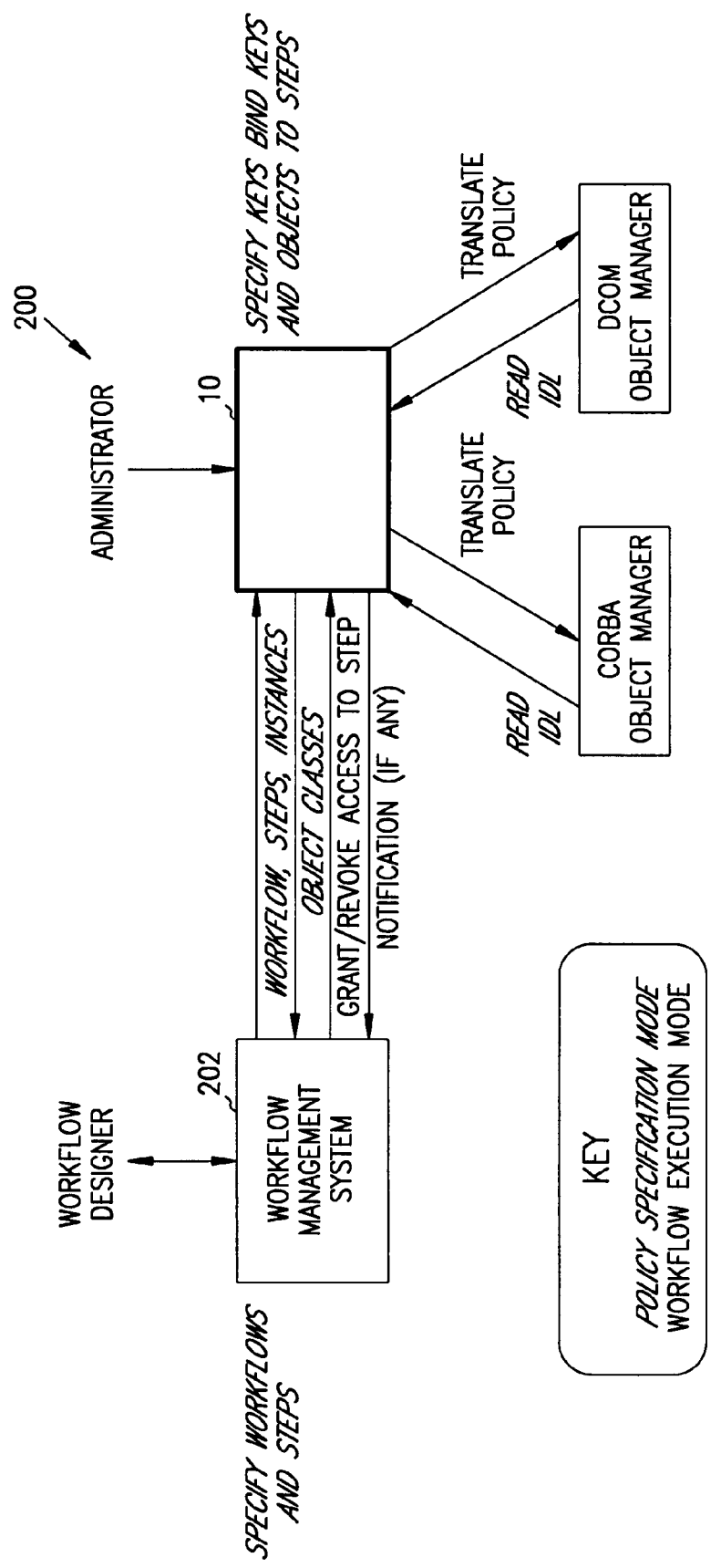
FIG. 17 illustrates a workflow enforcement system.

In one embodiment, as is shown in FIG. 17, a workflow enforcement system 200 includes a system 10 connected to a workflow management system 202. System 10 is a policy management tool. While it may be tempting to extend system 10 with workflow management features, the complexity of workflow management would overwhelm it. Instead, system 10 is used as the policy management engine for a WMS 202. System 10 is used simply to specify and enforce certain aspects of the workflow policy.

In one embodiment, workflow in system 200 is defined in WMS 202 and imported into system 10. In one such embodiment, workflow is imported as a collection of steps. It is not necessary to import the workflow conditions associated with each step, although such conditions could be modeled in system 10.

In one embodiment, workflow is modeled as a new layer in system 10. The new layer looks structurally like the other layers; that is, it has keys and key chains with associated constraints. The difference is in how the layer is built and interpreted. The new layer is called "the workflow layer" and a new designer, the workflow administrator, is responsible for its design.

In one embodiment, the workflow administrator begins by assessing the keys that are available for the workflow. The workflow often will require certain operations to be performed. If those operations are not represented in the available keys, the workflow administrator must create new keys. Once the necessary keys are imported, the workflow administrator collects the keys required for each step into a key chain that represents the step. The collection of key chains defined in this layer map one to one to the collection of steps in the workflow. The workflow administrator marks each step for export to the next layer, where they are assigned to the roles that will perform them. Several steps may be performed by the same role.

Figure 18:
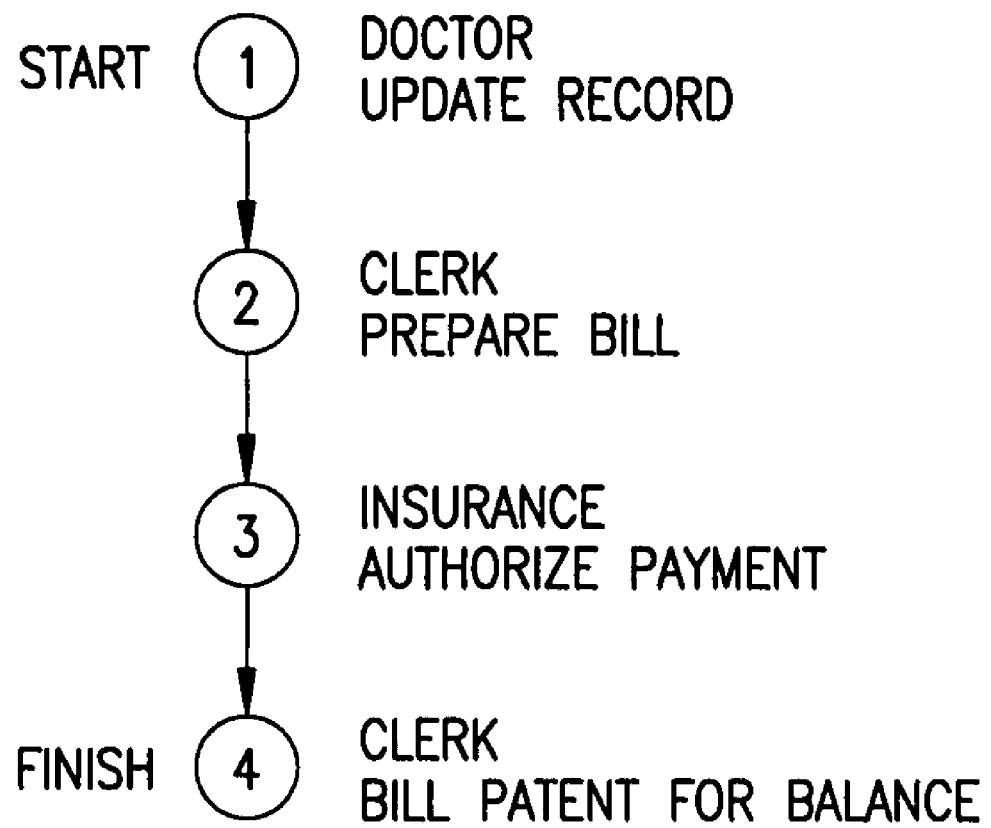
FIG. 18 illustrates a simple workflow example.

To illustrate this process, let us return to the hospital scenario described above. Suppose the system administrator, who also happens to be the workflow administrator, wants to specify the simple workflow illustrated in FIG. 18. This workflow states that whenever a DOCTOR updates a patient's medical record with treatment information, the CLERK must prepare a bill for the treatment. The bill must then be reviewed by the INSURANCE representative, who may authorize partial payment. Finally, the CLERK bills the patient for the remaining balance.

This workflow ensures that all bills are reviewed by the insurance representative before they are mailed to the patients, and it ensures that no insurance payment is authorized without a bill.

Figure 19:
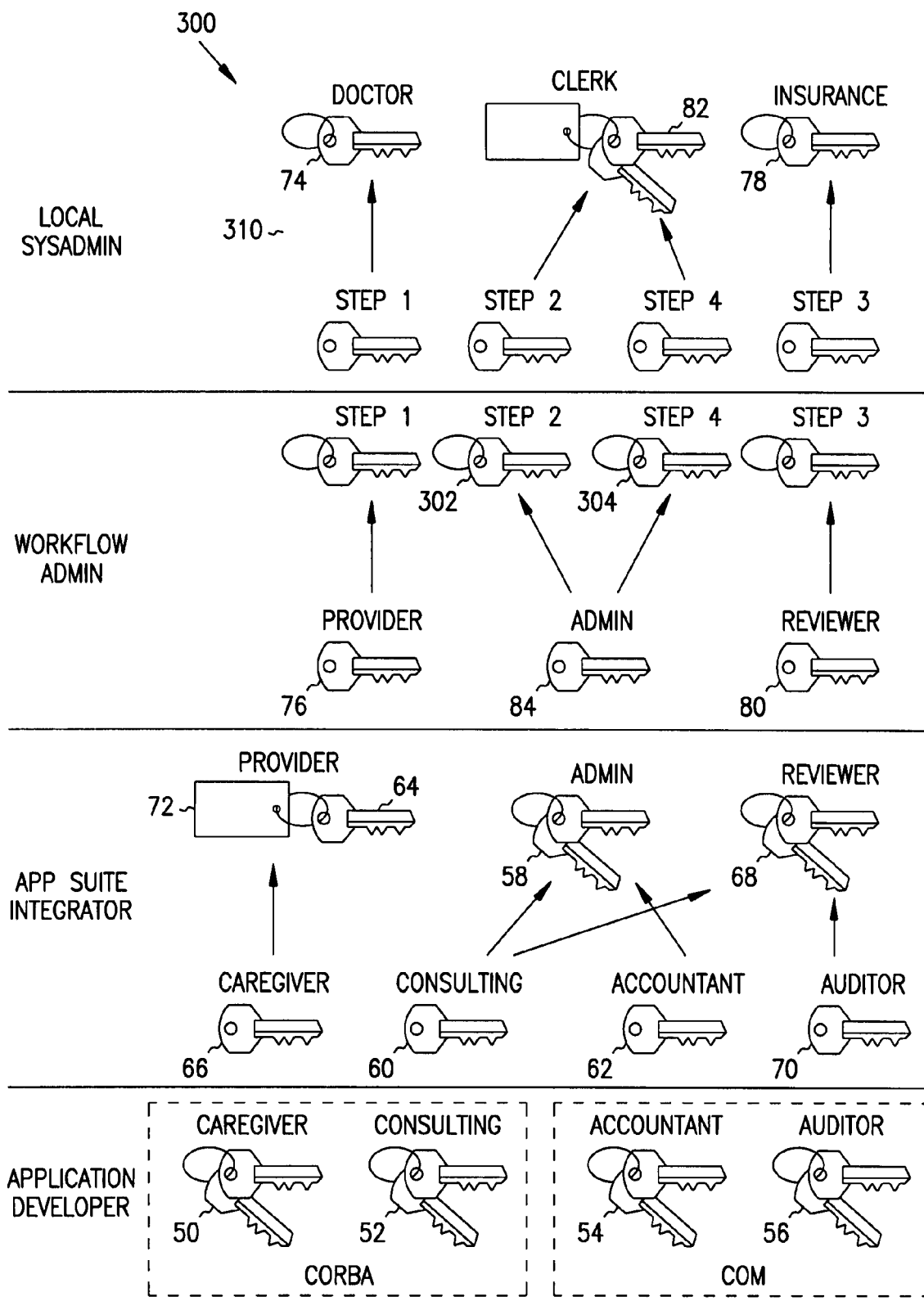
FIG. 19 illustrates how a new workflow layer is defined in the workflow enforcement system of FIG. 17.

FIG. 19 illustrates how a new workflow layer within model 300 is constructed. The bottom and second layers are constructed as before. Then the workflow administrator (who may be the system administrator) imports the keys (PROVIDER 76, ADMIN 84 and REVIEWER 80) necessary to perform the workflow from the second layer. (If these keys are insufficient to adequately describe the workflow, the workflow administrator could revisit the lower layers and construct additional keys.)

Keys 76, 80 and 84 are collected according to the steps that require them. Step 1 requires only PROVIDER key 76. Steps 2 and 4 require ADMIN key 84, so ADMIN key 84 appears on two separate key chains (302 and 304). If different operations are required between the two steps, we could introduce constraints on one or both of the key chains 302 or 304. Finally, step 3 requires only REVIEWER key 80.

The workflow administrator marks these four steps for export to system administrator level 310, where they are assigned to the roles (DOCTOR 74, CLERK 82 and INSURANCE 78) that will perform them. In the case of a role that can perform multiple steps (for example, CLERK), constraints are used to determine the appropriate step.

The main difference between a system 10 model without workflow and a system 10 model with workflow is that the latter divides roles into sub-roles by task. A system 10 model simply describes sets of sets, so the division is natural. However, as we will discuss next, there are huge differences in how these models are enforced.

System 10 is designed to provide central policy management with distributed policy enforcement. Once the policy is defined, it is "pushed out" to the various enforcement mechanisms in the distributed system. If the policy changes, the new version is pushed out. System 10 makes no access decisions itself.

Workflow management, on the other hand, requires some central policy enforcement. First, there can be many instances of a workflow active simultaneously. The accesses permitted a specific user may vary depending on the instance. Each access request must be bound to the appropriate instance, and that binding must occur in the WMS.

Second, for each workflow instance only one step (the current step) is active at any time. From an access control perspective, the permissions associated with the current step are granted only when the step begins and are revoked immediately after the step concludes. Each instance of a workflow may have a different current step at any point in time. The WMS must track the current step for each workflow instance in order to determine appropriate accesses.

Our initial investigation focused on ways to enforce work flow entirely within the local enforcement mechanisms. To satisfy workflow's central enforcement needs, it was thought that a workflow object would track the current step for each instance of a workflow. That is, system 10 would create the workflow object and bind it to the resources it controls. For each access request, the local enforcement mechanism would examine the corresponding workflow object and verify that the request is approved for the current step. If the request is approved, the local policy ("pushed out" as usual by system 10) would be enforced for that resource. The local enforcement mechanism would update the workflow object's indicator of current step as required.

There are several disadvantages with this approach. First, system 10 must be modified considerably to create and distribute workflow objects. Second, each access request requires an additional permission check to the workflow object, which may be expensive. Third, the enforcement mechanisms must be trusted to update the current step correctly. An enforcement mechanism could circumvent the workflow policy with malicious updates. Fourth, this approach would duplicate much of the workflow management processing already handled by WMS 202. Clearly this approach is very invasive, so we refocused our efforts on a solution that leaves system 10 and the local enforcement mechanisms relatively unchanged.

Policy enforcement can be partitioned into three layers, from lowest to highest: controlling access to resources, controlling access to steps and application-specific enforcement. A useful split occurs in the middle, or step, layer. Steps are a natural primitive for workflow designers. A WMS is specialized to create steps, determine their proper order and control execution of work flow instances according to that order. These operations are unique to workflow technology. However, access for a particular role to the resources associated with a particular step can be controlled by mechanisms that are commonly available in non workflow domains.

Our solution exploits these partitions by assigning the step layer and the application-specific layer to WMS 202 and by assigning the resource layer to system 10. Workflows, their steps and workflow conditions are specified within WMS 202. The steps are then exported to system 10, where resources and roles are bound to them. During workflow execution, WMS 202 manages workflow instances and directs system 10 to grant and revoke access, as appropriate, to specific steps. Workflow conditions are enforced by WMS 202 because they determine when the access grantings and revocations should occur.

A high-level design of our solution is illustrated in FIG. 19. This design illustrates two modes: policy specification mode and workflow execution mode. Operations for policy specification mode are noted in italics, while operations for workflow execution mode are noted in ordinary text. A classical workflow management system will isolate these modes into two modules: a specification module, which enables administrators to specify the workflow, and an execution module, which assists in coordinating and performing the procedures and activities. Traditionally the specification module is used only in pre-execution; however, researchers are recognizing the need for the two modules to co-evolve to handle dynamic change and exception handling.

The best way to explain the architecture is with a simple scenario for creating and executing a workflow.

The workflow designer begins by specifying an access control policy that will apply to all instances of the workflow. The designer creates the workflow and its steps using the specification tools in WMS 202. This information is then exported to system 10, where the binding of resources and roles to steps (as described above) occurs. System 10 has already gathered a list of available object classes from the IDL files of its object managers. This list is also provided to WMS 202 for creating workflow instances as described below. When this process is complete, the designer has created an access control policy for a particular class of workflow. This policy names the roles required, it identifies the steps that each role may take and the class of resources that can be accessed at each step.

The policy is, however, incomplete. It does not have enough information to control a workflow instance. For example, it does not name individual objects. The objects that may be accessed will depend on the current step of a workflow instance. Therefore, system 10 holds onto the policy for now; that is, it does not "push out" the policy for the enforcement engines.

Creating a workflow instance will be discussed next. At this point, system 10 is loaded with a set of access control policies for workflow classes. A workflow instance gets created when some event occurs to trigger it. For example, a user requests a check reimbursement form, or a notification appears in a user's in-box. When such an event occurs, WMS 202 determines the appropriate workflow for the event and creates a new instance of that workflow. The workflow instance is stored locally at WMS 202. The instance names the specific objects that may be accessed and the specific users that may access them.

When a workflow instance is created in WMS 202, it must also be created in system 10. In one embodiment, WMS 202 provides system 10 with the necessary information to instantiate the appropriate workflow's class access control policy, which means providing constraints such as "if object is named foo.txt" that will be added to the instance copy in system 10. The instance policy names (via constraints) the specific objects that can be accessed. If all specific objects are not known when the instance is created, WMS 202 may provide additional constraints for that instance later.

In summary, the workflow instance definition in system 10 looks like the class definition except that it also contains the constraints that name specific objects.

Executing the workflow instance will be discussed next. The execution phase highlights the simplicity of this solution. WMS 202 controls the execution of the workflow instance. It determines the proper sequence of steps (e.g., what branches are executed), and it knows which steps are active. It decides when a step should start (become active) and when it is completed (and thus become inactive). WMS 202 does what it implies: it manages the workflow. However, it relies on system 10 to manage the access control policy. As the workflow executes, WMS 202 directs system 10 to grant access to the active steps and revoke access to inactive steps. No policy is translated for the object managers unless directed by WMS 202.

For example, suppose that step 1 of workflow instance P is active. Once step 1 is complete, WMS 202 directs system 10 as follows:

Revoke access to step 1 in instance P, then grant access to step 2 in instance P.

Note that system 10 runs in tandem with WMS 202. With regard to policy translation, the only change in system 10's behavior is that it now "pushes out" the policy a step at a time rather than all at once.

CONCLUSION

The use of semantic layers within RBAC model 20 simplifies the structure and allows the model to clearly divide the process of creating security policy among several different users. One of the benefits of model 20 as defined above is the encapsulation of application specific security mechanisms into a unified environment. GUI 22 and the key/key chain paradigm provide a flexible approach for manipulating a security policy across a heterogeneous population of security mechanisms. System 10 greatly simplifies the task of policy creation and maintenance for the overworked systems administrator.

In addition, system 10 provides a method for adding an removing applications with minimal impact on other semantic layers, or on the local system administration layer. In a manner similar to the OSI TCP/IP model, clearly defined semantic boundaries can be used to create plug-and-play system security.

We have described a workflow management architecture that incorporates system 10 for workflow policy management. The architecture exploits the natural partitions in workflow policy management by assigning workflow specific tasks to the WMS and workflow-generic tasks to system 10. This approach lets each tool do what it does best. System 10 offers many benefits to workflow management, including simplified policy management and support for heterogeneous, distributed computing systems.

System 10's flexible model lets workflow be introduced at any layer. The support for distributed systems lets a workflow's control extend beyond the local system or local network. For instance, a business's divisions may be flung far across the Internet; workflows may span several divisions or even several companies (supplier, distributor, etc.). Also, a workflow may need to control resources under the purview of legacy enforcement mechanisms as well as resources managed by newer standards like CORBA. In fact, the WMS does not have to know how the resources under its control are managed. System 10 acts as a "universal adapter'" between the WMS and the policy enforcement mechanisms.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is intended that this invention be limited only by the claims and the equivalents thereof.

What is claimed is:

1. In a networked computer system having a workflow management system and a central policy management system, a method of operating the networked computer system to control workflow, comprising:

creating, by the workflow management system, a workflow class definition;

exporting, by the workflow management system, the workflow class definition to the central policy management system;
creating, within the central policy management system, an access control policy for the workflow class;
binding resources and roles to steps within the central policy management system, including:
  encapsulating security mechanism application specific information for each security mechanism, wherein encapsulating includes forming a key for each security mechanism;
  combining keys to form at least portions of policy as key chains in one or more semantic policy layers;
  associating workflow steps with the key chains;
  encapsulating key chains as keys and passing the key chain keys from a first semantic policy layer to a second semantic policy layer;
  importing a key chain from the second semantic policy layer to a local access policy layer; and
  enforcing the access control policy on the computer via the security mechanisms;
creating, by the workflow management system, a workflow instance in both the workflow management system and the central policy management system; and
executing the workflow instance within a computer.

2. The method of claim 1, wherein creating a workflow instance includes determining an appropriate workflow in response to a triggering event and generating the appropriate workflow instance in both the workflow management system and the central policy management system.

3. The method of claim 2, wherein creating a workflow instance includes:
  generating a workflow instance policy that identifies specific objects that can be accessed and specific users that may access the objects; and
  storing the workflow instance policy in the workflow management system.

4. The method of claim 1, wherein executing the workflow instance includes activating a workflow step according to the workflow management system and granting access control for the workflow step according to the central policy management system.

5. The method of claim 4, wherein executing the workflow instance includes deactivating a workflow step according to the workflow management system and revoking access control for the workflow step according to the central policy management system.

6. An article comprising a non-transitory computer readable medium having instructions thereon, wherein the instructions, when executed in a computer, create a system for executing the method comprising:
  creating a workflow class definition;
  exporting the workflow class definition to the central policy management system;
  binding resources and roles to steps within the central policy management system;
  encapsulating security mechanism application specific information for each security mechanism, wherein encapsulating includes forming a key for each security mechanism;
  combining keys to form key chains;
  associating workflow steps with the key chains;
  encapsulating key chains as keys and passing the key chain keys from a first semantic layer to a second semantic layer;
  importing a key chain from the second semantic layer to a local access policy layer; and enforcing the access control policy on the computer via the security mechanisms;
  creating a workflow instance in both the workflow management system and the central policy management system; and
  executing the workflow instance.

7. A workflow control system, comprising:
a workflow management system; and
a central policy management system;
wherein the workflow management system is configured to create a workflow class definition and export the workflow class definition to the central policy management system; and
wherein the central policy management system is configured to:
  encapsulate security mechanism application specific information for each security mechanism, including forming a key for each security mechanism;
  combine keys into key chains to form at least portions of policy as key chains in one or more semantic policy layers;
  associate workflow steps with the key chains; and
  assign roles to the workflow steps;
  encapsulate key chains as keys and pass the key chain keys from a first semantic policy layer to a second semantic policy layer;
  import a key chain from the second semantic policy layer to a local access policy layer; and
  enforce the local access policy via the security mechanisms.

8. The system of claim 7, wherein the workflow management system is configured to:
  receive a trigger for workflow;
  determine an appropriate workflow in response to the trigger; and
  generate an instance of the appropriate workflow in both the workflow management system and the central policy management system.

9. The system of claim 8, wherein the workflow management system is configured to:
  generate a workflow instance policy that identifies specific objects that can be accessed and identifies specific users that may access the objects; and
  store the workflow instance policy in a memory of the workflow management system.

10. The system of claim 7, wherein the workflow management system is configured to activate a workflow step to execute a workflow instance, and
wherein the central policy management system is configured to grant access control for the workflow step.

11. The system of claim 7, wherein the workflow management system is configured to deactivate a workflow step, and wherein the central policy management system is configured to revoke access control for the workflow step when the workflow is completed.

12. An apparatus comprising:
a network interface;
a first processing unit communicatively coupled to the interface, wherein the first processing unit is configured to implement a workflow manager; and
a second processing unit communicatively coupled to the interface and remote from the workflow manager, wherein the second processing unit is configured to implement a central policy management system,
wherein the workflow manager creates a workflow class definition and exports the workflow class definition to the remote central policy management system that is configured to bind resources and roles to workflow steps, and wherein the central policy management system is configured to:
encapsulate security mechanism application specific information for each security mechanism, including forming a key for each security mechanism;
combine keys into key chains to form at least portions of policy as key chains in one or more semantic policy layers;
associate workflow steps with the key chains; and
assign roles to the workflow steps;
encapsulate key chains as keys and pass the key chain keys from a first semantic policy layer to a second semantic policy layer;
import a key chain from the second semantic policy layer to a local access policy layer; and
enforce the local access policy via the security mechanisms.

13. The apparatus of claim 12, including a memory coupled to the processing unit, wherein the processing unit is configured to:
generate a workflow instance that includes a workflow instance policy that identifies specific objects that can be accessed and specific users that may access the objects;
store the workflow instance policy in the memory; and
activate a workflow step according to the workflow instance, wherein access to a resource needed for the workflow step is granted by the central policy management system.

14. The apparatus of claim 12, including an input configured to receive a trigger for workflow, and wherein the processing unit is configured to:
determine an appropriate workflow in response to the trigger;
generate a workflow instance of the appropriate workflow; and
export the workflow instance to the central policy management system.

15. The apparatus of claim 14, wherein the processing unit is configured to:
activate a workflow step according to the triggered workflow, wherein access to a resource needed for the workflow step is granted by the central policy management system;
deactivate the workflow step when the workflow step is completed, wherein the central policy management system is configured to revoke the access to the resource, and
activate a subsequent workflow step according to the workflow instance.

* * * * *